US012571582B2

(12) United States Patent
Schimmele et al.

(10) Patent No.: US 12,571,582 B2
(45) Date of Patent: Mar. 10, 2026

(54) HOUSEHOLD APPLIANCE HAVING AN AMBIENT LIGHT DETECTION UNIT AND METHOD FOR OPERATING A HOUSEHOLD APPLIANCE

(71) Applicant: BSH Hausgeräte GmbH, Munich (DE)

(72) Inventors: Martin Schimmele, Unterschneidheim (DE); Armin Weber, Lauchheim (DE)

(73) Assignee: BSH Hausgeräte GmbH, Munich (DE)

( * ) Notice: Subject to any disclaimer, the term of this patent is extended or adjusted under 35 U.S.C. 154(b) by 433 days.

(21) Appl. No.: 18/084,758

(22) Filed: Dec. 20, 2022

(65) Prior Publication Data

US 2023/0194156 A1 Jun. 22, 2023

(30) Foreign Application Priority Data

| Dec. 20, 2021 | (DE) | .................... | 10 2021 214 671.6 |
| Dec. 20, 2021 | (DE) | .................... | 10 2021 214 672.4 |
| Dec. 20, 2021 | (DE) | .................... | 10 2021 214 673.2 |
| Dec. 20, 2021 | (DE) | .................... | 10 2021 214 674.0 |

(51) Int. Cl.
| *F25D 27/00* | (2006.01) |
| *F21V 23/04* | (2006.01) |
| *F21W 131/305* | (2006.01) |
| *F25D 29/00* | (2006.01) |
| *G01J 1/02* | (2006.01) |
(Continued)

(52) U.S. Cl.
CPC ........ *F25D 27/005* (2013.01); *F21V 23/0464* (2013.01); *F25D 29/00* (2013.01); *G01J 1/0271* (2013.01); *G01J 1/4204* (2013.01);

*G05B 19/042* (2013.01); *F21W 2131/305* (2013.01); *F25D 2700/02* (2013.01); *G05B 2219/2654* (2013.01)

(58) Field of Classification Search
CPC .... F21V 23/0464; F25D 27/005; F25D 29/00; F25D 29/005; G05B 2219/2654; F21W 2131/305
See application file for complete search history.

(56) References Cited

U.S. PATENT DOCUMENTS 6,804,974 B1 * 10/2004 Voglewede ........... F25D 23/126
362/276
7,832,224 B2 11/2010 Roo et al.
(Continued)

FOREIGN PATENT DOCUMENTS

CN 102213535 A 10/2011
CN 208109686 U 11/2018
(Continued)

*Primary Examiner* — Lionel Nouketcha
(74) *Attorney, Agent, or Firm* — Laurence A. Greenberg; Werner H. Stemer; Ralph E. Locher

(57) ABSTRACT
A household appliance includes an ambient light detection unit that has a sensor housing and a brightness sensor that detects the brightness of the light in the environment of the household appliance. The brightness sensor is disposed in the sensor housing. The household appliance has a housing having a front strip and a door fastened to the housing. The ambient light detection unit is disposed on a front strip or on a door closure strip of the door. A method is disclosed for the specific setting of the brightness of an illuminating apparatus for a household refrigeration appliance.

14 Claims, 10 Drawing Sheets

(51) Int. Cl.
     *G01J 1/42*          (2006.01)
     *G05B 19/042*        (2006.01)

(56)                References Cited

U.S. PATENT DOCUMENTS

2007/0044497 A1 *   3/2007   Roo ..................... F25D 27/005
                                                            62/126
2007/0223210 A1     9/2007   Schubert
2016/0061514 A1 *   3/2016   Seo ..................... F21V 33/0044
                                                            312/405
2016/0313052 A1 *  10/2016   Eicher ................... G02B 6/001
2017/0108267 A1     4/2017   Osbar et al.
2017/0153055 A1 *   6/2017   Hong ................... F25D 29/005

FOREIGN PATENT DOCUMENTS

| | | |
|---|---|---|
| CN | 113494810 A | 10/2021 |
| DE | 102004021858 A1 | 12/2005 |
| DE | 102006040192 A1 | 4/2007 |
| DE | 102008058022 A1 | 5/2010 |
| DE | 102012205475 A1 | 10/2013 |
| DE | 102013220630 A1 | 4/2015 |
| DE | 102014205727 A1 | 10/2015 |
| DE | 102016014265 A1 | 5/2018 |
| EP | 3339775 A1 | 6/2018 |
| JP | 2006342996 A | 12/2006 |
| WO | 03010474 A1 | 2/2003 |
| WO | 2011040026 A1 | 4/2011 |
| WO | 2012095937 A1 | 7/2012 |
| WO | 2015155020 A1 | 10/2015 |
| WO | 2019129299 A1 | 7/2019 |

* cited by examiner

HOUSEHOLD APPLIANCE HAVING AN AMBIENT LIGHT DETECTION UNIT AND METHOD FOR OPERATING A HOUSEHOLD APPLIANCE

CROSS-REFERENCE TO RELATED APPLICATION

This application claims the priority, under 35 U.S.C. § 119, of German Patent Applications:
DE 10 2021 214 671.6, filed Dec. 20, 2021,
DE 10 2021 214 672.4, filed Dec. 20, 2021,
DE 10 2021 214 673.2, filed Dec. 20, 2021,
DE 10 2021 214 674.0, filed Dec. 20, 2021;
the prior applications are herewith incorporated by reference in their entirety.

FIELD AND BACKGROUND OF THE INVENTION

One aspect of the invention relates to a household appliance having an ambient light detection unit and a method for the specific setting of the brightness of an illuminating apparatus for a household refrigeration appliance. The ambient light detection unit has a sensor housing and a brightness sensor that detects the brightness of the light in the environment of the household appliance. The brightness sensor is disposed in the sensor housing.

An illumination of an interior space of a household refrigeration appliance is known from U.S. Pat. No. 6,804,974 B1. That interior space illumination can be set to various brightness levels in dependence upon the ambient brightness of the household refrigeration appliance.

SUMMARY OF THE INVENTION

It is accordingly an object of the invention to provide a household appliance having an ambient light detection unit and a method for operating a household appliance, which overcome the hereinafore-mentioned disadvantages of the heretofore-known appliances and methods of this general type, in which an ambient light detection unit can be disposed as required and in which the operation, in particular of the illuminating apparatus, is improved.

With the foregoing and other objects in view there is provided, in accordance with the invention, a household appliance having an ambient light detection unit. The ambient light detection unit has a sensor housing and a brightness sensor. The brightness sensor detects the brightness of the light in the environment of the household appliance. The brightness sensor is disposed in the sensor housing. The household appliance has a housing having a front strip and a door that is fastened to the housing. The ambient light detection unit is disposed on the front strip or a door closure strip, in particular directly on the rear side, of the door. As a consequence, this ambient light detection unit is positioned in a space saving manner and is protected against mechanical or other influences. Furthermore, the ambient light detection unit uses an installation space that is preferably already provided in the household appliance in order to also be able to be installed there. As a consequence, it is not necessary to reduce or redesign other regions of the household appliance.

The ambient light detection unit is disposed with at least one snap connection on the front strip or door closure strip. Such a detachable connection is on the one hand mechanically stable and on the other hand can be particularly easily detached and reattached again. A reversible installation and removal is consequently achieved in a simple manner.

In particular, the front strip that is mentioned above is an upper front strip when viewed in the height direction of the household appliance. In particular, the door closure strip that is mentioned above is an upper door closure strip when viewed in the height direction of the door.

In one exemplary embodiment, the sensor housing is configured in a multi-part manner, the sensor housing has a front-side sensor housing part and a rear-side sensor housing part that are connected to one another by a snap latching connection.

In one exemplary embodiment, the ambient light detection unit has at least one optical imaging element, in particular a lens, with which the ambient light that is incident on the sensor housing is focused toward the brightness sensor. It is possible by virtue of such an exemplary embodiment of an ambient light detection unit to guide the ambient light more extensively and more precisely to the brightness sensor in the interior of the sensor housing. As a consequence, it is possible to improve the accuracy of the determination of the brightness of the ambient light, in particular to make the determination more precise. By explicitly using a lens in this case that focuses the light and consequently a converging lens that is in particular at least on one side configured to be convex, it is possible to focus the ambient light onto the brightness sensor.

In one exemplary embodiment, the lens is a lens that is at least on one side formed as convex. The lens can be spherical or aspherical. A particularly high light proportion of the incident ambient light can therefore be deflected in such a way that it is targeted and directed toward the brightness sensor.

In one exemplary embodiment, the brightness sensor is disposed in a focus of the lens. As a consequence, the ambient light that is incident in the sensor housing arrives in a particularly localized manner on the brightness sensor.

In one exemplary embodiment, the lens can be configured as a separate component to the sensor housing. The lens can then also be disposed directly on the sensor housing. In particular, the sensor housing can have a hole for this purpose and the lens is disposed in the hole or adjacent to the hole.

In one advantageous exemplary embodiment, the lens is configured as a single piece with the sensor housing. The number of components can thereby be reduced. A particularly positionally accurate configuration of the lens with respect to the sensor housing is consequently rendered possible. This position can also be maintained permanently. A single-piece embodiment also renders possible a simple production process. For example, an injection molded component can be realized in this case. It is also possible that this component is a 2K component. For example, the sensor housing and the lens can thereby be formed from different materials, in particular can be produced by injection molding.

It is also possible that the sensor housing is at least in regions transparent. This then means that, at least in regions, light that is in the visible spectral range for humans can penetrate the sensor housing. In particular, the sensor housing can be transparent at the position at which the lens is disposed.

In one exemplary embodiment, the lens is disposed on the sensor housing with at least one outer side exposed toward the environment. As a consequence, the light from the environment is directly incident onto the outer side of the lens. Consequently, it is possible to omit extensively different light paths, which the ambient light must initially travel, in particular also in the sensor housing, in order to be able to arrive at this lens and to be focused at the lens. A shorter path is thereby also rendered possible from the lens to the brightness sensor in the sensor housing. Undesired light losses of the ambient light, which is incident on the sensor housing, can consequently be avoided.

In one exemplary embodiment, the ambient light detection unit has a light guide that is different to a lens. The light that is incident in the sensor housing is guided in an intended manner using this light guide. The light can be guided in particular to the brightness sensor.

In one exemplary embodiment, the lens and the light guide are coupled to one another. In particular, the lens is disposed in the beam path of the incident ambient light upstream of the light guide. It is thereby rendered possible that on the one hand the light is focused and on the other hand the light also arrives in a targeted manner at the brightness sensor by virtue of the light guide. The light losses in the sensor housing can consequently also be further reduced. A particularly high proportion of the incident ambient light is then guided in a particularly directed and defined manner to the brightness sensor.

In one exemplary embodiment, the lens is configured as an end of the light guide. It is configured in particular as a single piece with the light guide. By virtue of such an integrated embodiment of the light guide with the lens, it is in turn possible to reduce the number of components and to render possible a particularly exact deflection and guiding of the incident ambient light to the brightness sensor.

In particular, the lens is produced as a single piece with the light guide. For example, this can be a single-part plastic component.

In one exemplary embodiment, the ambient light detection unit has a circuit board. The brightness sensor is disposed on this circuit board. In one exemplary embodiment, it is possible to provide that in addition a moisture sensor is also disposed on this circuit board. It is thereby possible to use the one circuit board to receive multiple different sensors.

With the objects of the invention in view, there is further provided a household appliance. This household appliance has an ambient light detection unit in accordance with the above-mentioned aspect of the invention or an advantageous exemplary embodiment thereof. The household appliance can be in particular a household refrigeration appliance. In this regard, the household appliance can be provided so as to store and conserve food in an intended manner. The household refrigeration appliance can be for example a refrigerator appliance or a freezer appliance.

In one exemplary embodiment, the household appliance has a housing. At least one receiving compartment for food is formed in this housing. This receiving compartment can be a refrigerator compartment or a freezer compartment. In one exemplary embodiment, the household appliance has at least one door with which it is possible to close the front side of the receiving compartment. The door can be disposed in a movable manner on the housing. A household appliance having an ambient light detection unit is then particularly advantageous if this receiving compartment is to be illuminated by an illuminating apparatus or receiving compartment illumination of the household appliance at least when a door is in the opened state. Since a household appliance can be positioned in a wide variety of ambient conditions, it is also possible for particularly diverse and different levels of brightness to occur at the installation location. Thus, for example in particularly dark rooms or under particularly dark ambient conditions this can lead to the fact that a user who opens the door and looks into the receiving compartment is possibly dazzled if the illuminating apparatus or receiving compartment illumination is too bright. On the other hand, in different ambient conditions, it is possible for the illuminating apparatus to be too dark or insufficient or for the contrast to the ambient light to be insufficient. In order to be able to satisfy all of these particularly diverse installation conditions and thereby accompanying particularly different ambient brightness conditions, in order to also set the illuminating apparatus in dependence thereon as required, the invention mentioned above is particularly advantageous. The reason for this is that the particularly exact determination of the ambient brightness is thereby rendered possible. In dependence thereon, it is then in turn possible to set the illuminating apparatus of the household appliance in a particularly needs-based manner. In the case of opening the door or an opened door and an activated illuminating apparatus, it is then possible for this receiving compartment to be illuminated in a particularly needs-based manner and in dependence upon this ambient brightness that is detected.

In one exemplary embodiment, the household appliance has a housing. In particular, the household appliance has a front strip. This front strip is disposed on the housing. The front strip is in this regard disposed on the front side of the housing. In one exemplary embodiment, the ambient light detection unit is disposed on the front strip, in particular directly on the rear side. The ambient light detection unit can be disposed using a detachable mechanical connection on the front strip on the rear side. For example, such a detachable mechanical connection can be at least a snap connection. A particularly advantageous installation of this sensor housing is thereby achieved. On the one hand, a mechanically stable fastening configuration is rendered possible, on the other hand a concealed construction is rendered possible. This sensor housing is consequently not exposed to the front. Nevertheless, it is then rendered possible that the ambient light that is incident on the front side on the front strip arrives at the brightness sensor.

The front strip can be a front strip that is oriented horizontally or oriented vertically. The front strip can also be a cross member. This front strip can be formed in a beam-like manner. The front strip can be covered on the rear side with thermal insulation, in particular insulating foam or can be free of any thermal insulation.

In one exemplary embodiment, the household appliance has a door. The door includes an inner side and outer side between which a thermal insulation layer, in particular insulating foam, is preferably provided. The door can be mounted in a pivotable manner on the housing for example in relation to a pivot axis that extends vertically, a so-called swinging door. The door can also be a drawer door that is guided in a linear manner by telescopic rails. Moreover, the door has a door closure strip that is provided in the height direction of the household appliance usually on an upper or lower edge of the door for sealing purposes. In one exemplary embodiment, the ambient light detection unit is disposed on an upper or a lower door closure strip, in particular directly on the rear side or on the inner surface of the upper door closure strip. The ambient light detection unit can be disposed using a detachable mechanical connection on the door closure strip on the rear side or on the interior or insulation side surface. The door closure strip extends with its longitudinal side in the width direction of the household appliance and is usually facing with its outer main surface upward. For example, such a detachable mechanical connection can be at least a snap connection. A particularly advantageous installation of this sensor housing is thereby achieved. On the one hand, a mechanically stable fastening configuration is rendered possible, on the other hand a concealed construction is rendered possible. This sensor housing is consequently to the greatest possible extent outwardly hidden, nevertheless it is then possible that the ambient light that is incident on the front side on the outer surface of the door closure strip arrives at the brightness sensor.

In one exemplary embodiment, the front strip or the door closure strip has a hole through which the ambient light detection unit detects the incident ambient light. The rest of the ambient light detection unit is then disposed in such a way that it is covered and also protected by the front strip or door closure strip. Nevertheless, it is possible for sufficient ambient light to be incident into the sensor housing or onto the lens through this hole.

In one exemplary embodiment, the household appliance has at least one door by virtue of which the hole is at least shaded when the door is in the closed state with the result that ambient light arrives at most reduced at the hole. When a door is in the closed state in this exemplary embodiment, the detection of the ambient light and consequently also the evaluation of the brightness of the ambient light is thereby only limited or rendered possible to an insufficient extent. This is in particular then the case if the household appliance is an integrated appliance and a separate design plate is disposed on a front side of a door leaf of the door. Such a design plate can be for example a furniture front plate. When viewed in the height direction of the household appliance, the hole in the front side is disposed overlapping with the design plate. In the depth direction of the household appliance, at most a minimum distance is formed between the hole and the design plate with the result that the hole is shaded by the design plate at least for the ambient light. This is nevertheless an advantageous installation position especially in the case of integrated appliances or appliances that, although with the closed door do not possibly completely cover the hole in the front strip, are however disposed so close to the hole that the ambient light is shaded. The reason for this is that it is possible to install the ambient light detection unit in a space-saving manner and nevertheless then when a door is at least in a part opened state and then a hole in the front strip is no longer shaded, it is possible to detect the ambient brightness in a particularly precise manner. Although in one exemplary embodiment then when a door is in the closed state, due to the shading that is at least provided the ambient brightness cannot be detected or cannot be detected to a sufficient extent, the above-mentioned installation position is advantageous. The reason for this is that for example above a receiving compartment a free space that is provided in the housing can be used in which other electronic components are also disposed. This space is then also additionally occupied by the ambient light detection unit. It is thereby possible to maintain the volume of the receiving compartment and this region can be used for the electronic components, in particular above the receiving compartment, in order to also position the ambient light detection unit therein. This has corresponding advantages in relation to avoiding redesigns of other regions of the household appliance, in particular of the household refrigeration appliance. Nevertheless, the concept is such that when a door is in the opened state the ambient brightness can be detected in a particularly precise manner. This suffices in particular in order to be able to adapt the illuminating apparatus particularly rapidly and as required to the ambient brightness that is detected without creating an undesired dazzling or an excessively weak illumination of the interior space depending on the ambient brightness.

In one exemplary embodiment, the household appliance has two separate doors that are disposed adjacent to one another in the width direction of the household appliance, wherein in particular the hole is formed, in particular centrally, between the two doors on the front strip. This is advantageous in the case of a household refrigeration appliance that has two front doors as wing doors. When viewed in the width direction, if the hole is disposed centrally between the mutually facing narrow sides of the two doors, it is thus possible to use this ambient light detection unit for the two doors. The reason for this is that then the hole, which in the closed state is only covered in regions in each case by the two doors, is thus exposed or this coverage is removed as the door is opened, with the result that sufficient ambient light can also be incident through the exposed region of the hole to the brightness sensor. This is also the case then if the second door is still closed and the further region of the hole is covered by this second door. When the doors are in the closed state, these doors preferably lie on a front strip that is oriented vertically. The illuminating apparatuses can thereby also be operated individually and independently of one another for each receiving compartment, in particular in each case only dependent upon whether the associated door is open or not. Only one such hole and one brightness sensor are then required in order to at least control the two separate illuminating apparatuses of the two separate receiving compartments in dependence upon the respective door actuation and the ambient light detection.

In one exemplary embodiment, the household appliance has a door actuation identification unit, in particular magnetic, inductive or capacitive sensor or the like. This is provided in an intended manner so as to automatically detect a door actuation, wherein in dependence upon a door actuation of this type the detection unit can be activated so as to detect the ambient brightness. In one exemplary embodiment, the detection unit is thus only then activated if the door is actuated. Otherwise, the detection unit is in particular deactivated. As a consequence, it is possible to achieve a more energy efficient operation. Undesired erroneous detections that would occur when a door is in the closed state and would entail an ambient brightness detection that is too imprecise can consequently be avoided. By virtue of this door actuation identification unit it is also preferably possible to detect a door actuation in a particularly precise manner. It is also thereby possible to detect in a particularly precise manner when the detection is to start and subsequently when an adaptation of the illuminating apparatus of the household appliance is to be performed. Moreover, the door actuation identification unit preferably transmits the opening of the door to a control unit of the household appliance which activates the detection sensor and implements the method in accordance with the invention.

In one exemplary embodiment, it is provided that the household appliance has a control unit. The components of the household appliance are controlled using this control unit. In particular, the signals of the detection unit can thereby also be processed.

In one exemplary embodiment, it is provided that, in particular controlled by the control unit, the detection unit is only then activated so as to detect the ambient brightness if a predetermined time interval has also additionally elapsed after a door actuation is identified. This time interval amounts to at most one second. In one exemplary embodiment, this also means that in dependence upon a door actuation, in particular a starting opening procedure of the door, the detection unit only begins to detect the ambient brightness with this time delay with respect to the opening of the door. It is also thereby possible to avoid that in the case of a door that is still slightly opened, an ambient brightness is determined that then possibly leads to inaccuracies or to also imprecise results. In particular, it is rendered possible that the illuminating apparatus can then also be set by the control unit in a particularly rapid manner. This also means that even when the door is accordingly already open, the adaptation scenario with which the illuminating apparatus is adapted in dependence upon the ambient brightness that is detected also happens particularly rapidly. It is also possible as a consequence for the observing user to then identify that the appliance reacts almost intelligently to the ambient brightness and automatically adapts the illuminating apparatus as required. This adaptation is then still also effectively observable by the user. By virtue of the mentioned time window in which the detection is also then concluded within one second after the beginning of the measuring procedure and the adaptation of the illuminating apparatus is also then promptly performed, it is also possible in this case for example to avoid an undesired dazzling of the observer of the interior space since an illumination of the receiving compartment, which is too bright, is avoided from the beginning of the opening of the door.

Since, especially in the case of integrated appliances when the door is in the closed state with the design plate that is disposed on the front side, there can be practically no or only a minimal incidence of ambient light through slots between the furniture front plate on the door and adjoining furniture walls, especially in the case of integrated appliances it is not expediently possible to detect the ambient brightness when the door is in the closed state in order to also be able to make an exact statement regarding the actual brightness in the environment. Especially in such constellations, it is therefore particularly expedient that the ambient brightness is only then begun to be measured when the door is only slightly open. The above-mentioned invention is particularly expedient in precisely such constellations.

With the objects of the invention in view, there is additionally provided a method for operating a household appliance having the following steps:

opening a door of the household appliance;

automatically setting a base illumination scenario for illuminating a receiving compartment of the household appliance, which is opened by virtue of opening the door, in particular independently of the brightness in the environment of the household appliance, wherein the illumination of the receiving compartment is performed by using an illuminating apparatus of the household appliance;

detecting the brightness of the environment of the household appliance by using an ambient light detection unit of the household appliance, in particular wherein the detection starts automatically by virtue of the opening of the door;

evaluating the detected brightness of the environment using an evaluating unit of the household appliance;

generating an end illumination scenario for the receiving compartment in dependence upon the detected brightness; and illuminating the receiving compartment by using the end illumination scenario when the door is in the opened state.

By virtue of such a method it is henceforth rendered possible that a household appliance can be operated as required with regard to the illuminating apparatus. Especially then if a compact construction of the household appliance is provided and in this context in particular the ambient light detection unit is at least shaded when the door is in the closed state, the proposed method is of particular advantage. The reason for this is then that when the door is in the closed state this ambient light detection unit can also be disposed in a protected manner and is consequently concealed to the front, in particular by the door itself. Contamination, for example by dust or the like, can therefore also be better avoided when the door is in the closed state. Nevertheless, in the case of the proposed method it is then achieved that the receiving compartment or the receiving compartment as required can then be illuminated, in particular adapted to the brightness of the environment. In this context, in the case of the proposed method it is then also achieved that when the door is opened, it is possible to detect the ambient brightness and in this context also sufficiently rapidly so that then if the user has opened the door so wide that they can look extensively into the receiving compartment, the end illumination scenario is preferably already activated.

It is therefore also rendered possible in the case of this method that the user is not dazzled by the illuminating situation in the receiving compartment if the ambient brightness is relatively low, on the other hand the illumination of the receiving compartment is performed with the result that a simple and extensive perception of the objects in the receiving compartment is rendered possible. Furthermore, it is also possible in the event of a particularly bright environment to also set an illuminating apparatus as required.

It is preferred that the detection of the brightness of the environment is only started automatically with the opening of the door. This means that in this exemplary embodiment, the single trigger function or the single trigger criterion in order to begin the detection of the brightness of the environment with the ambient light detection unit is the procedure of opening the door. This thus also in this case means that the ambient light detection unit is then in particular activated if a procedure of opening the door is initiated. This can occur for example by virtue of the fact that the door starting from the closed position is pulled away from the housing of the household appliance and is pivoted about a vertical pivot axis. If the door is therefore already lifted slightly on at least one side with respect to the closed position from the front region of the housing of the household appliance, in one exemplary embodiment this already applies as the opened position. In one exemplary embodiment, the door is therefore opened at the point in time in which the door is in this regard slightly lifted from the front region of the housing. In this regard the door is then already disposed at least in this position preferably in a contactless manner with respect to the front region of the housing, which the door in the fully closed state lies directly on. The slight lifting is usually triggered by a door sensor, in particular a magnetic sensor. The door sensor is accordingly provided so as to detect the lifting of the door from the housing of the household appliance and to report through a control unit of the household appliance or to directly report the lifted state of the door to the ambient light detection unit. The opening of the door is preferably detected automatically by a door actuation identification unit, in particular a magnetic, inductive or capacitive sensor or the like. This door actuation identification unit is provided in an intended manner so as to detect a door actuation, wherein the detection unit can be activated so as to detect the ambient brightness in dependence upon such a door actuation. In one exemplary embodiment, the ambient light detection unit is thus only then activated if the door is actuated. Otherwise, the ambient light detection unit is in particular deactivated. As a consequence, it is possible to achieve a more energy-efficient operation. Undesired erroneous detections that would occur in the event of a door that is in the closed state and would entail an ambient brightness detection that is too imprecise can consequently be avoided. It is preferred that by virtue of this door actuation identification unit it is also possible to detect a door actuation in a particularly exact manner. It is thereby also possible to identify in a particularly precise manner when the detection is to start and subsequently an adaptation of the illuminating apparatus of the household appliance is to be performed. Moreover, the door actuation identification unit preferably transmits the opening of the door to a control unit of the household appliance, which activates the detecting sensor and implements the method in accordance with the invention.

In another exemplary embodiment, the opening of the door can mean that the door is opened so far that the ambient light detection unit is exposed or is no longer shaded to such an extent that it could only detect the brightness of the environment to an insufficient extent. If this exposure is achieved or the ambient light detection unit is no longer covered, in this exemplary embodiment the detection of the brightness of the environment can start promptly.

When the door is in the closed state, the brightness of the environment is not detected by using the ambient light detection unit.

In one exemplary embodiment, the start of the detection of the brightness of the environment is delayed by a predetermined period of time, in particular between 0.5 s and 1.2 s, after starting to open the door. As a consequence, it is particularly advantageously achieved that the door is already opened so wide that the brightness detection is performed sufficiently precisely. A distortion of the detection due to the still too intense shading of the ambient light detection unit due to the door is consequently avoided. Nevertheless, this time interval is so small that the detection would start particularly late after the beginning of the opening procedure and therefore the detection procedure, in particular also then would be performed more extensively, if the door is already entirely opened. This would then for example possibly again lead to a dazzling if the user looks into the receiving compartment.

In one exemplary embodiment, the detection of the brightness of the environment is performed for a specific period of time. This can be a predetermined period of time. In particular, the period of time can be at most two seconds, in particular at most one second. This is a further particularly advantageous exemplary embodiment. The reason for this is that such a time window is on the one hand large enough in order to perform a more precise detection of the prevailing brightness of the environment. It is consequently possible to achieve a particularly representative statement with regard to the brightness of the environment with reference to this sensor information that is obtained in this time span. On the other hand, this time interval is so small that the door does not remain in the entirely closed state or in the almost entirely opened state for longer or also does not arrive there at all. In this context, it is namely consequently possible to avoid a long undesired dazzling or a long excessively weak illumination after the point in time at which the door is opened to such a sufficient extent that a user can extensively look into the receiving compartment, which is usually longer than the above-mentioned time span that is provided for the detection of the brightness of the environment. This scenario in which this period of time of the detection of the brightness of the environment is less than or identical to the usual period of time that a user requires in order to bring the door from the closed state into such a wide opened position in which they can extensively look into the receiving compartment is advantageous. The reason for this is that it is thereby possible to achieve that the procedure of detecting the brightness of the environment is concluded with the result that prior to the actual procedure of the user extensively looking into the receiving compartment the end illumination scenario is already present and is set, in particular is already completely set. In fact, it has then during the actual process of looking into the receiving compartment or during the process of observing the receiving compartment already set an illumination scenario in the form of the end illumination scenario or it is just then set. Undesired brightness changes and/or color changes and consequently an undesired observing situation for the user are consequently also avoided.

In one exemplary embodiment, in the end illumination scenario, the brightness of the light of the illuminating apparatus for illuminating the receiving compartment is increased in comparison to the base illumination scenario and/or changes a light color of the light of the illuminating apparatus for illuminating the receiving compartment in comparison to the base illumination scenario. Thus in one advantageous exemplary embodiment, in particular the brightness is set relatively low in the base illumination scenario with the result that in the case of the most diverse ambient brightness levels then as required this brightness of the light of the illuminating apparatus can be increased and particularly precisely adapted. In particular in such a way that the observer is not dazzled if they look into the receiving compartment when a door is in the opened state. While possibly only or additionally also the light color of the light is adapted, the illumination scenario that is generated can be further better adapted to the respective environment situation. A particularly user-friendly and as required illumination scenario is consequently achieved with the result that in most diverse ambient conditions a particularly user-friendly observing possibility of the receiving compartment is provided.

In one exemplary embodiment, the brightness of the light signal of the illuminating apparatus is changed by a pulse width modulation of the light signal when the illumination scenarios are changed. This is in particular then advantageous if the at least one light source of the illuminating apparatus is a light diode. It is consequently then possible in a particularly precise and continuous manner to set the brightness of the light signal or the light which is generated by the light source.

In one exemplary embodiment, the brightness of the light of the illuminating apparatus in the base illumination scenario is set to a value between 20 percent and 30 percent, in particular to 25 percent, of the maximum brightness of the illuminating apparatus. This is a particularly advantageous percentage value interval. The reason for this is that as a consequence on the one hand a relatively low brightness value is set as a base value with the result that in the most diverse ambient conditions then a particularly needs-based adaptation and consequently in particular an increase of the brightness is rendered possible. On the other hand, this base value is not so small that a sufficient illumination of the receiving compartment would no longer be provided. It is thus also already possible with this base value to achieve an illumination of the receiving compartment which likewise renders possible a user-friendly observation of the receiving compartment in the case of specific ambient conditions.

In one exemplary embodiment, the brightness of the light of the illuminating apparatus in the end illumination scenario is set to a value between 50 percent and 100 percent of the maximum brightness of the illuminating apparatus. In one exemplary embodiment, there is thereby then also a clear difference with respect to a base brightness value as is automatically set in the base illumination scenario. In particular, the brightness of the light in the end illumination scenario is set in dependence upon the brightness of the environment in a stage of in particular multiple discrete predetermined stages. In one exemplary embodiment, this brightness is therefore a predetermined end value that is predetermined in general in the end illumination scenario. It is also possible that the end value of the brightness in the end illumination scenario can be continuously changed. On the other hand, it is also possible that specific predetermined brightness values or end stages in the end illumination scenario are set in dependence upon the ambient brightness. For example, it is possible in this case to store and in each case then to use multiple different end values, such as 50 percent and/or 75 percent and/or 100 percent, of the maximum brightness of the illuminating apparatus as likewise predetermined end values or end stages. It is preferred that this increase of the brightness value from the base brightness in the base illumination scenario to the brightness value in the end illumination scenario is set within a predetermined period of time, preferably within a period of time of less than or identical to 1.5 seconds, in particular between 0.5 seconds and 1.5 seconds. It is possible by virtue of such a rapid change to also set the end illumination scenario particularly rapidly, in particular this can then be achieved if the opening process of the door reaches the entirely opened or substantially entirely opened state. Such an entirely opened door is in particular then achieved if the door has been pivoted about the pivot axis at least by 45 degrees, in particular at least by 50 degrees, in particular at least by 55 degrees, in particular by at least 65 degrees, in particular at least by 70 degrees, in particular at least by 75 degrees, in comparison to the entirely closed position.

In one exemplary embodiment, the brightness of the light that is emitted by the illuminating apparatus is continuously changed during the change from the base illumination scenario to the end illumination scenario. In particular, a dimming is performed. In particular, the period of time of the continuous change is between 0.7 seconds and 1.5 seconds, in particular between 0.8 s and 1.2 s. This is likewise particularly advantageous since as a consequence an abrupt or rapid change of the brightness and/or the light color change can be avoided. A particularly advantageous and user-friendly method is consequently achieved without so to speak startling the user by light effects.

In one exemplary embodiment, the brightness of the environment is not detected when a door is in the closed state. In particular, when a door is in the closed state, the ambient light detection unit is shaded by the door. This means that the door in particular does not entirely cover the ambient light detection unit however nevertheless the door is disposed so near to the ambient light detection unit that a detection of the brightness of the environment would not be rendered possible or would only be rendered possible in a particularly imprecise and consequently unhelpful manner. This is for example then the case if the household appliance is an integrated appliance and is disposed in an integration recess of a furniture panel. Since in such exemplary embodiments in particular an additional separate design plate, for example a furniture front plate, is disposed in a fixed manner on the front side on a door leaf of the door and is coupled in a movable manner to the door, the integration recess is practically entirely covered by the furniture front plate. The design plate can project beyond the side edges of the door with the result that the ambient light detection unit can be covered or shaded by the design plate alone. The minimal gap between the edge of the furniture front plate and the further walls of the furniture wall, which delimit the integration recess, in any case render possible a particularly small light incidence into the integration recess from the environment of the furniture wall. In this embodiment, therefore when a door is in the closed state the ambient light detection unit is then shaded.

One aspect of the invention relates to a household appliance having the ambient light detection unit in accordance with the above-mentioned aspect or an ambient detection unit. The ambient light detection unit or ambient detection unit has a sensor housing and a circuit board. The circuit board is in particular a coherent single circuit board, in particular a printed circuit board, on which at least two separate sensors are disposed, wherein one sensor detects a first environmental parameter and a further sensor detects a second environmental parameter that is different to the first environmental parameter. As a consequence, the ambient light detection unit or ambient detection unit is configured in a multifunctional manner. It can receive multiple sensors in a compact manner on a circuit board and consequently multiple different items of ambient information can be detected.

A sensor can be a brightness sensor. The ambient brightness or the ambient light can thereby be detected.

A sensor can be a moisture sensor. The ambient moisture can thereby be detected. A sensor can be a temperature sensor. The ambient temperature can thereby be detected.

A sensor can be a door position identifying sensor. An opening of the door can thereby also be detected. The door position identifying sensor can be a magnetic sensor. In particular, it is thereby also rendered possible to identify positions of two adjacent doors, for example wing doors of a household refrigeration appliance, particularly if the door position identifying sensor is positioned centrally between the two doors. It is thereby also rendered possible to identify positions of drawer doors of a household refrigeration appliance.

The ambient light detection unit or ambient detection unit has a communication interface with which it is possible to transmit the detected information from at least two of the sensors. Only one such interface is thereby required in order nevertheless to be able to transmit information from multiple sensors.

In particular, the communication interface is a D bus or a I2C bus. These are particularly advantageous communication interfaces for the transmission of information from different sensors. The information can be transmitted rapidly and in a loss-free manner. A robust communication is also possible in the case of many different sensors. In particular, it is also possible to simultaneously transmit information from multiple sensors.

In particular, at least one receiving configuration, in particular solder pad, of a sensor is formed on the circuit board and it is selectively possible to attach to the receiving configuration selectively different sensor types that detect the same environmental parameters. This means that with one and the same circuit board it is rendered possible to attach a first sensor type of a sensor or a second sensor type of a sensor to the receiving configuration. The receiving configuration, which can also be referred to as a receiving region, is therefore compatible in a diverse manner for these different sensor types.

In particular, the ambient detection unit has a sensor housing and a brightness sensor. The brightness sensor detects the brightness of the light in the environment of the household appliance. The brightness sensor is disposed in the sensor housing. The household appliance has a housing having a front strip. The ambient detection unit is disposed on the front strip, in particular directly on the rear side. As a consequence, this ambient detection unit is positioned in a space saving manner and is protected against mechanical or other influences. Furthermore, the ambient detection unit uses an installation space that is preferably already provided in the household appliance in order to also be able to be installed there. As a consequence, it is not necessary to reduce or redesign other regions of the household appliance.

The ambient detection unit is disposed with at least one snap connection on the rear side of the front strip. Such a detachable connection is on the one hand mechanically stable, on the other hand can be particularly easily detached and reattached again. A reversible installation and removal is consequently achieved in a simple manner.

In particular, the front strip that is mentioned above is an upper front strip when viewed in the height direction of the household appliance.

In one exemplary embodiment, the sensor housing is configured in a multi-part manner, the sensor housing has a front-side sensor housing part and a rear-side sensor housing part.

In one exemplary embodiment, the ambient detection unit has at least one optical imaging element, in particular a lens, with which the ambient light that is incident on the sensor housing is focused toward the brightness sensor. It is possible by virtue of such an exemplary embodiment of an ambient detection unit to guide the ambient light more extensively and more precisely to the brightness sensor in the interior of the sensor housing. As a consequence, it is possible to improve the accuracy of the determination of the brightness of the ambient light, in particular to make the determination more precise. By explicitly using a lens in this case that focuses the light and consequently a converging lens that is in particular at least on one side configured to be convex, it is possible to focus the ambient light onto the brightness sensor.

In one exemplary embodiment, the lens is a lens that is at least on one side formed as convex. The lens can be spherical or aspherical. A particularly high light proportion of the incident ambient light can therefore be deflected in such a way that it is targeted and directed toward the brightness sensor.

In one exemplary embodiment, the brightness sensor is disposed in a focus of the lens. As a consequence, the ambient light that is incident in the sensor housing arrives in a particularly localized manner on the brightness sensor.

In one exemplary embodiment, the lens can be configured as a separate component to the sensor housing. The lens can then also be disposed directly on the sensor housing. In particular, the sensor housing can have a hole for this purpose and the lens is disposed in the hole or adjacent to the hole.

In one advantageous exemplary embodiment, the lens is configured as a single piece with the sensor housing. The number of components can thereby be reduced. A particularly positionally accurate configuration of the lens with respect to the sensor housing is consequently rendered possible. This position can also be maintained permanently.

A single-piece embodiment also renders possible a simple production process. For example, an injection molded component can be realized in this case. It is also possible that this component is a 2K component. For example, the sensor housing and the lens can thereby be formed from different materials, in particular can be produced by injection molding.

It is also possible that the sensor housing is at least in regions transparent. This then means that, at least in regions, light that is in the visible spectral range for humans can penetrate the sensor housing. In particular, the sensor housing can be transparent at the position at which the lens is disposed.

In one exemplary embodiment, the lens is disposed on the sensor housing with at least one outer side exposed toward the environment. As a consequence, the light from the environment is directly incident onto the outer side of the lens. Consequently, it is possible to omit extensively different light paths, which the ambient light must initially travel, in particular also in the sensor housing, in order to be able to arrive at this lens and to be focused at the lens. A shorter path is thereby also rendered possible from the lens to the brightness sensor in the sensor housing. Undesired light losses of the ambient light, which is incident on the sensor housing, can consequently be avoided.

In one exemplary embodiment, the ambient detection unit has a light guide that is different to a lens. The light that is incident in the sensor housing is guided in an intended manner using this light guide. The light can be guided in particular to the brightness sensor.

In one exemplary embodiment, the lens and the light guide are coupled to one another. In particular, the lens is disposed in the beam path of the incident ambient light upstream of the light guide. It is thereby rendered possible that on the one hand the light is focused and on the other hand the light also arrives in a targeted manner at the brightness sensor by virtue of the light guide. The light losses in the sensor housing can consequently also be further reduced. A particularly high proportion of the incident ambient light is then guided in a particularly directed and defined manner to the brightness sensor.

In one exemplary embodiment, the lens is configured as an end of the light guide. It is configured in particular as a single piece with the light guide. By virtue of such an integrated embodiment of the light guide with the lens, it is in turn possible to reduce the number of components and to render possible a particularly exact deflection and guiding of the incident ambient light to the brightness sensor.

In particular, the lens is produced as a single piece with the light guide. For example, this can be a single-part plastic component.

In one exemplary embodiment, the ambient detection unit has a circuit board, in particular a printed circuit board. The brightness sensor is disposed on this circuit board. In one exemplary embodiment, it is possible to provide that in addition a moisture sensor is also disposed on this circuit board. It is thereby possible to use the one circuit board to receive multiple different sensors.

With the objects of the invention in view, there is concomitantly provided a household appliance. This household appliance has an ambient detection unit in accordance with the above-mentioned aspect or an advantageous exemplary embodiment thereof. The household appliance can be in particular a household refrigeration appliance. In this regard, the household appliance can be provided so as to store and conserve food in an intended manner. The household refrigeration appliance can be for example a refrigerator appliance or a freezer appliance.

In one exemplary embodiment, the household appliance has a housing. At least one receiving compartment for food is formed in this housing. This receiving compartment can be a refrigerator compartment or a freezer compartment. In one exemplary embodiment, the household appliance has at least one door with which it is possible to close the front side of the receiving compartment. The door can be disposed in a movable manner on the housing. A household appliance having an ambient detection unit is then particularly advantageous if this receiving compartment is to be illuminated by an illuminating apparatus of the household appliance at least when a door is in the opened state. Since a household appliance can be positioned in a wide variety of ambient conditions, it is also possible for particularly diverse and different levels of brightness to occur at the installation location. Thus, for example in particularly dark rooms or under particularly dark ambient conditions this can lead to the fact that a user who opens the door and looks into the receiving compartment is possibly dazzled if the interior space illumination or receiving compartment illumination is too bright. On the other hand, in different ambient conditions, it is possible for the interior space illumination to be too dark or insufficient or for the contrast to the ambient light to be insufficient. In order to be able to satisfy all of these particularly diverse installation conditions and thereby accompanying particularly different ambient brightness conditions in order to also set the illuminating apparatus in dependence thereon as required, the invention mentioned above is particularly advantageous. The reason for this is that the particularly exact determination of the ambient brightness is thereby rendered possible. In dependence thereon, it is then in turn possible to set the interior space illumination of the household appliance in a particularly needs-based manner. In the case of opening the door or an opened door and an activated interior space illumination, it is then possible for this receiving compartment to be illuminated in a particularly needs-based manner and in dependence upon this ambient brightness that is detected.

In one exemplary embodiment, the household appliance has a housing. In particular, the household appliance has a front strip. This front strip is disposed on the housing. The front strip is in this regard disposed on the front side of the housing. In one exemplary embodiment, the ambient detection unit is disposed on the front strip, in particular directly on the rear side. The ambient detection unit can be disposed using a detachable mechanical connection on the front strip on the rear side. For example, such a detachable mechanical connection can be at least a snap connection. A particularly advantageous installation of this sensor housing is thereby achieved. On the one hand, a mechanically stable fastening configuration is rendered possible, on the other hand a concealed construction is rendered possible. This sensor housing is consequently not exposed to the front. Nevertheless, it is then rendered possible that the ambient light that is incident on the front side on the front strip arrives at the brightness sensor.

The front strip can be a front strip that is oriented horizontally or oriented vertically. The front strip can also be a cross member. This front strip can be formed in a beam-like manner.

In one exemplary embodiment, the front strip has a hole through which the ambient detection unit detects the incident ambient light, in particular using the brightness sensor. The rest of the ambient detection unit is then disposed in such a way that it is covered and also protected by the front strip. Nevertheless, it is possible for sufficient ambient light to be incident into the sensor housing or onto the lens through this hole.

In one exemplary embodiment, the household appliance has at least one door by virtue of which the hole is at least shaded when the door is in the closed state with the result that ambient light arrives at most reduced at the hole. When a door is in the closed state in this exemplary embodiment, the detection of the ambient light and consequently also the evaluation of the brightness of the ambient light is thereby only limited or rendered possible to an insufficient extent. This is in particular then the case if the household appliance is an integrated appliance and a separate design plate is disposed on a front side of a door leaf of the door. Such a design plate can be for example a furniture front-side plate. When viewed in the height direction of the household appliance, the hole in the front side is disposed overlapping with the design plate. In the depth direction of the household appliance, at most a minimum distance is formed between the hole and the design plate with the result that the hole is shaded by the design plate at least for the ambient light. This is nevertheless an advantageous installation position especially in the case of integrated appliances or appliances that, although with the closed door do not possibly completely cover the hole in the front strip, are however disposed so close to the hole that the ambient light is shaded. The reason for this is that it is possible to install the ambient light detection unit in a space-saving manner and nevertheless then when a door is at least in a part opened state and then a hole in the front strip is no longer shaded, it is possible to detect the ambient brightness in a particularly precise manner. Although in one exemplary embodiment then when a door is in the closed state, due to the shading that is at least provided the ambient brightness cannot be detected or cannot be detected to a sufficient extent, the above-mentioned installation position is advantageous. The reason for this is that for example above a receiving compartment a free space that is provided in the housing can be used in which other electronic components are also disposed. This space is then also additionally occupied by the ambient detection unit. It is thereby possible to maintain the volume of the receiving compartment and this region can be used for the electronic components, in particular above the receiving compartment, in order to also position the ambient detection unit therein. This has corresponding advantages in relation to avoiding redesigns of other regions of the household appliance, in particular of the household refrigeration appliance. Nevertheless, the concept is such that when a door is in the opened state the ambient brightness can be detected in a particularly precise manner. This suffices in particular in order to also be able to adapt the interior space illumination particularly rapidly and as required to the ambient brightness that is detected without creating an undesired dazzling or an excessively weak illumination of the interior space depending on the ambient brightness.

In one exemplary embodiment, the household appliance has two separate doors that are disposed adjacent to one another in the width direction of the household appliance, wherein in particular the hole is formed, in particular centrally, between the two doors on the front strip. This is advantageous in the case of a household refrigeration appliance that has two front doors as wing doors. When the doors are in the closed state, these doors can lie on a front strip that is oriented vertically. When viewed in the width direction, if the hole is disposed centrally between the mutually facing narrow sides of the two doors, it is thus possible to use this ambient detection unit for the two doors. The reason for this is that then the hole, which in the closed state is only covered in regions in each case by the two doors, is thus exposed or this coverage is removed as the door is opened with the result that sufficient ambient light can also be incident through the exposed region of the hole to the brightness sensor. This is also the case then if the second door is still closed and the further region of the hole is covered by this second door. The interior space illuminations can thereby also be operated individually and independently of one another for each receiving compartment, in particular in each case only dependent upon whether the associated door is open or not. Only one such hole and one brightness sensor are then required in order to control at least the two separate interior space illuminations of the two separate receiving compartments in dependence upon the respective door actuation and the ambient light detection.

In one exemplary embodiment, the household appliance has a door actuation identification unit, in particular a magnetic, inductive or capacitive sensor or the like. This is provided in an intended manner so as to detect a door actuation, wherein in dependence upon a door actuation of this type the brightness sensor or the detection unit can be activated so as to detect the ambient brightness. In one exemplary embodiment, the brightness sensor is thus only then activated if the door is actuated. Otherwise, the brightness sensor is in particular deactivated. As a consequence, it is possible to achieve an energy efficient operation. Also, undesired erroneous detections that would occur when a door is in the closed state and would entail an ambient brightness detection that is too imprecise can consequently be avoided. By virtue of this door actuation identification unit, it is also preferably possible to detect a door actuation in a particularly precise manner. It is also thereby possible to detect in a particularly precise manner when the detection is to start and subsequently when an adaptation of the interior space illumination of the household appliance is to be performed.

In one exemplary embodiment, it is provided that the household appliance has a control unit. The components of the household appliance are controlled using this control unit. In particular, signals of the detection unit can also thereby be processed.

In one exemplary embodiment, it is provided that, in particular controlled by the control unit, the detection unit is only then activated so as to detect the ambient brightness if a predetermined time interval has also additionally elapsed after a door actuation is identified. This time interval amounts to at most one second. In one exemplary embodiment, this also means that in dependence upon a door actuation, in particular a starting opening procedure of the door, the detection unit only begins to detect the ambient brightness with this time delay with respect to the opening of the door. It is also thereby possible to avoid that in the case of a door that is still slightly opened, an ambient brightness is determined that then possibly leads to inaccuracies or to also imprecise results. In particular, it is rendered possible that the illuminating apparatus can then also be set by the control unit in a particularly rapid manner. This also means that even when the door is accordingly already open, the adaptation scenario with which the interior space illumination is adapted in dependence upon the ambient brightness that is detected also happens particularly rapidly. It is also possible as a consequence for the observing user to then identify that the appliance reacts almost intelligently to the ambient brightness and automatically adapts the interior space illumination as required. This adaptation is then still also effectively observable by the user. By virtue of the mentioned time window in which the detection is also then concluded within one second after the beginning of the measuring procedure and the adaptation of the interior space illumination is also then promptly performed, it is also possible in this case for example to avoid an undesired dazzling of the observer of the interior space since an illumination of the receiving compartment, which is too bright, is avoided from the beginning of the opening of the door.

Since especially in the case of integrated appliances when the door is in the closed state with the design plate that is disposed on the front side, there can be practically no or only a minimal incidence of ambient light through slots between the furniture front plate on the door and adjoining furniture walls, especially in the case of integrated appliances it is not expediently possible to detect the ambient brightness when the door is in the closed state in order to also be able to make an exact statement regarding the actual brightness in the environment. Especially in such constellations, it is therefore particularly expedient that the ambient brightness is only then begun to be measured when the door is only slightly open. The above-mentioned invention is particularly expedient in precisely such constellations.

The terms "top," "bottom," "front," "rear," "horizontal," "vertical," "depth direction," "width direction," "height direction" indicate the positions and orientations that are provided in the case of intended use and intended positioning of the appliance.

Further features of the invention are apparent in the claims, the figures and the description of the figures. The features and feature combinations, which are mentioned in the description above, and also the features and feature combinations that are mentioned in the description of the figures below and/or are illustrated alone in the figures cannot merely be used in the combination disclosed in each case but rather can also be used in other combinations or in isolation without departing the scope of the invention. Consequently, embodiments of the invention that are not explicitly illustrated and explained with regard to the figures but are provided and can be produced by separate feature combinations in the explained embodiments are to be regarded as included and disclosed. Also, embodiments and feature combinations that consequently do not have all the features of an originally worded independent claim are to be regarded as disclosed.

Although the invention is illustrated and described herein as embodied in a household appliance having an ambient light detection unit and a method for operating a household appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
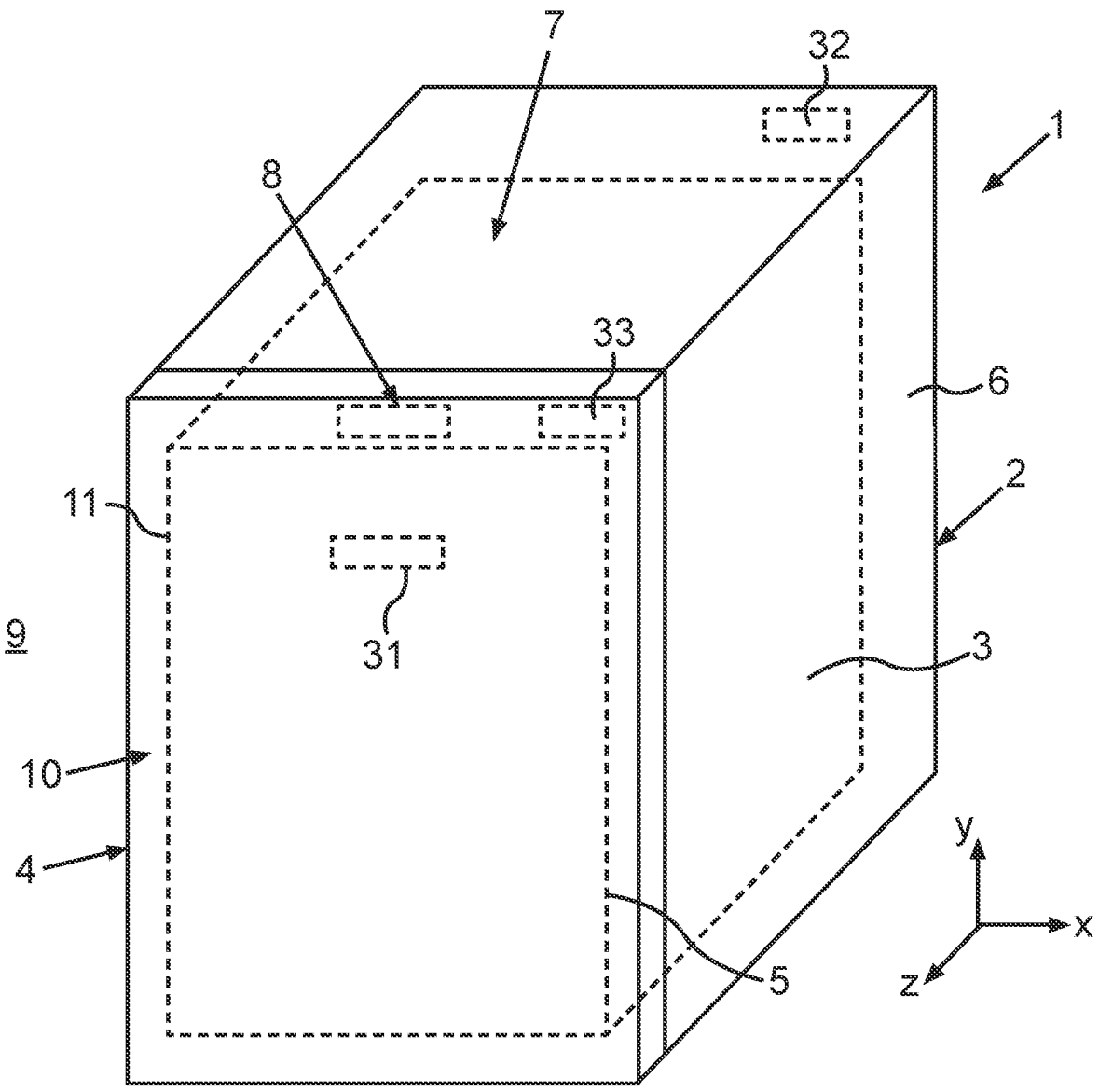
FIG. 1 is a diagrammatic, perspective view of an exemplary embodiment of a household appliance in accordance with the invention, having an exemplary embodiment of an ambient light detection unit in accordance with the invention.

Referring now in detail to the figures of the drawings, in which identical or functionally identical elements are provided with the same reference characters, and first, particularly, to FIG. 1 thereof, there is seen a household appliance 1. It can be in particular a household refrigeration appliance. This can be configured so as to store and conserve food. The household appliance can be a refrigerator appliance or a freezer appliance or a fridge-freezer combination appliance. The household appliance 1 can however also be for example a dishwasher. Another household appliance is also possible. In particular, such a household appliance that can be disposed as an integrated appliance in a furniture wall.

In the case of the household appliance 1 that is provided in this case, it is provided that in one exemplary embodiment it is an integrated appliance of this type. The household appliance 1 has a housing 2. At least one receiving compartment 3 is formed in the housing 2. The receiving compartment 3 is provided in this case in particular so as to receive food.

The household appliance 1 furthermore has a door 4. The door 4 is disposed in a movable manner on the housing 2. The door is disposed in this case so as to close the front side of the interior space or the receiving compartment 3. The door 4 is illustrated herein in the closed state. The receiving compartment 3 is delimited by walls of a container 5. The container 5 can be for example an inner container that is formed from plastic. This is realized in particular in such a manner in the case of a household refrigeration appliance.

A free space can be formed between the container 5 and an outer housing 6. This can be filled at least in regions by thermally insulating material. This is for example the case in the case of a household refrigeration appliance. A free space 7 is formed above the container 5 and the outer housing 6 in the height direction (y direction). This can also be referred to as an electronics assembly compartment. It is possible to install electronics modules of the household appliance 1 in this electronics assembly compartment. In the exemplary embodiment, it is provided that an ambient light detection unit 8 of the household appliance 1 is also disposed in this free space 7. This is provided in an intended manner at least so as to detect the brightness in an environment 9 of the household appliance 1. The brightness of the light in the environment of the household appliance 1 is detected by this ambient light detection unit 8.

The door 4 has a door leaf 10. This plate-shaped or cuboid component likewise has an outer wall 11 and an inner wall or inner cladding that is not apparent in FIG. 1. In particular, an intermediate space can be filled with thermally insulating material between the outer wall 11 and this inner cladding as is the case for example in the case of a household refrigeration appliance.

In particular then if the household appliance 1 is an integrated appliance, in one exemplary embodiment a design plate 12 (FIG. 2) is also additionally provided. This design plate 12 that is separate to the door leaf 10 can be for example a furniture front plate. The design plate covers the front of the door leaf 10, in particular entirely. The design plate 12 is in particular fixedly connected to the door leaf 10 and is in particular coupled in a movable manner to this door leaf. In the case of an integrated appliance, it is also provided that this household appliance 1 is disposed in an integration recess of a furniture wall. This integration recess is usually delimited by delimiting walls, in particular wall elements. Furthermore, further regions of this furniture front wall can connect to the side in the width direction and upward in the height direction. When the door 4 is in the closed state, there is then only always merely a particularly small gap between the boundary edges of the furniture front plate 12 and the adjoining further furniture plates of this furniture wall. It is therefore the case especially in this state and in the case of such an exemplary embodiment that ambient light from the environment 9 of the furniture wall practically does not arrive in the integration recess or arrives in the integration recess to an insufficient extent if the door 4 is in the closed state. Consequently, especially in this state and when the door 4 is in the closed state, a sufficient detection of the ambient brightness can thereby not be performed.

Figure 2:
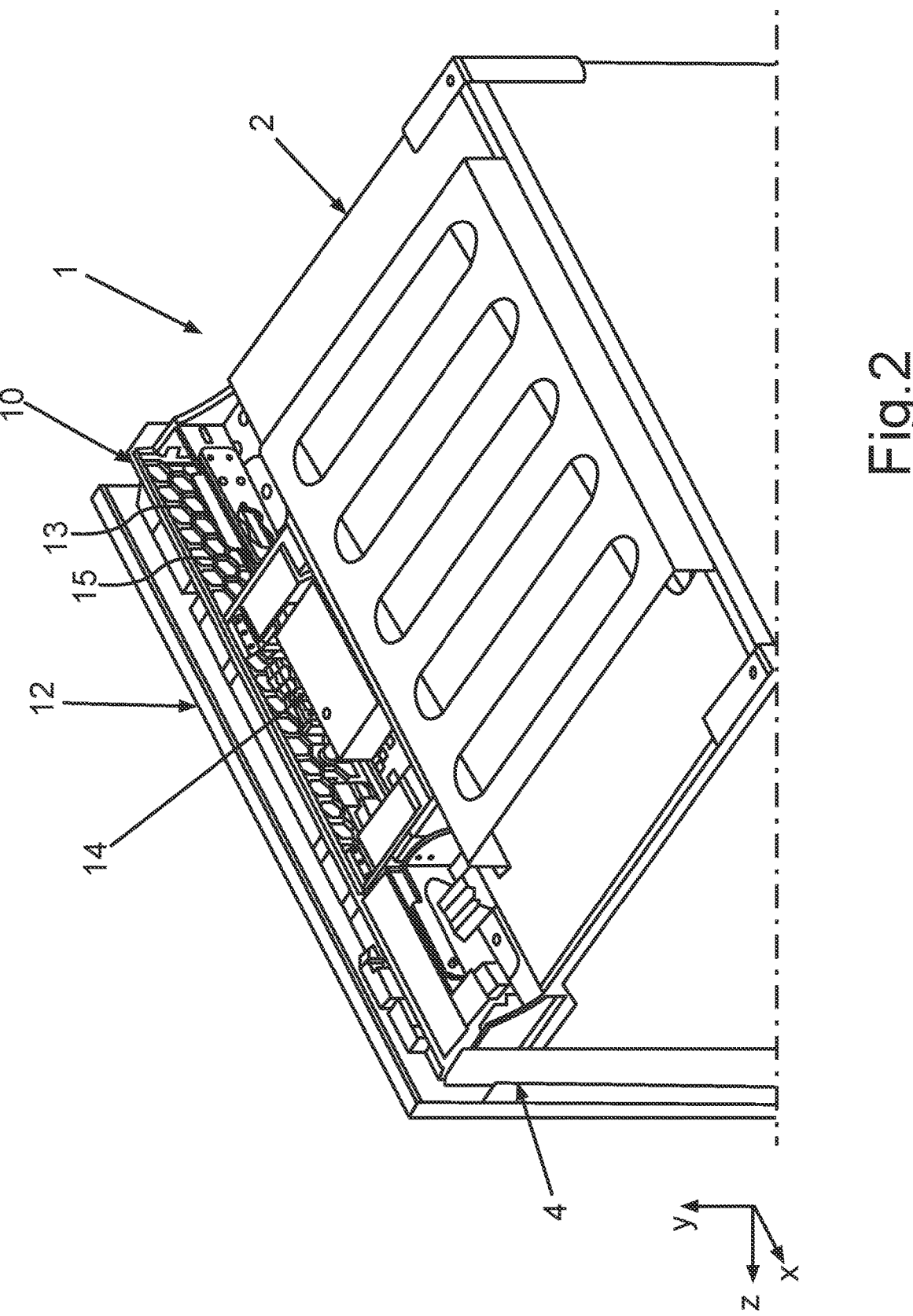
FIG. 2 is a perspective view of the household appliance in accordance with FIG. 1 in the upper region.

FIG. 2 illustrates an exemplary embodiment of the household appliance 1 in a part representation and in a perspective from above. As is apparent, when viewed in the depth direction (z direction) the housing 2 has a front strip 13 in a front region. The front strip 13 extends in a plate-like manner or strip-like manner in the width direction (x direction). The front strip 13 is in particular a separate component. The front strip is in particular disposed on a front flange of the housing 2, in particular of the outer housing 6. The front strip is an upper front strip 13 in the exemplary embodiment in this case. This means that the front strip is disposed on the upper front edge region of the housing 2, in particular of the outer housing 6. In the illustrated exemplary embodiment, a sensor housing 14 of the ambient light detection unit 8 is disposed on this front strip. In particular, this sensor housing 14 is disposed directly on a rear side 15 of this front strip 13. In one exemplary embodiment, it is possible to realize a detachable mechanical connection in this case. As is apparent in this regard for example in FIG. 4, a snap connection 16 is formed. The sensor housing 14 is snapped to this rear side 15 using this snap connection.

The front strip 13 is preferably formed from plastic. It is in particular produced as a single piece. For example, it can be an injection molded component. As is apparent in FIG. 2 and in FIG. 3 in an enlarged part representation of a section from FIG. 2, the rear side 15 in one exemplary embodiment is formed with a reinforcing structure 17. This can be for example a honeycomb structure.

Figure 3:
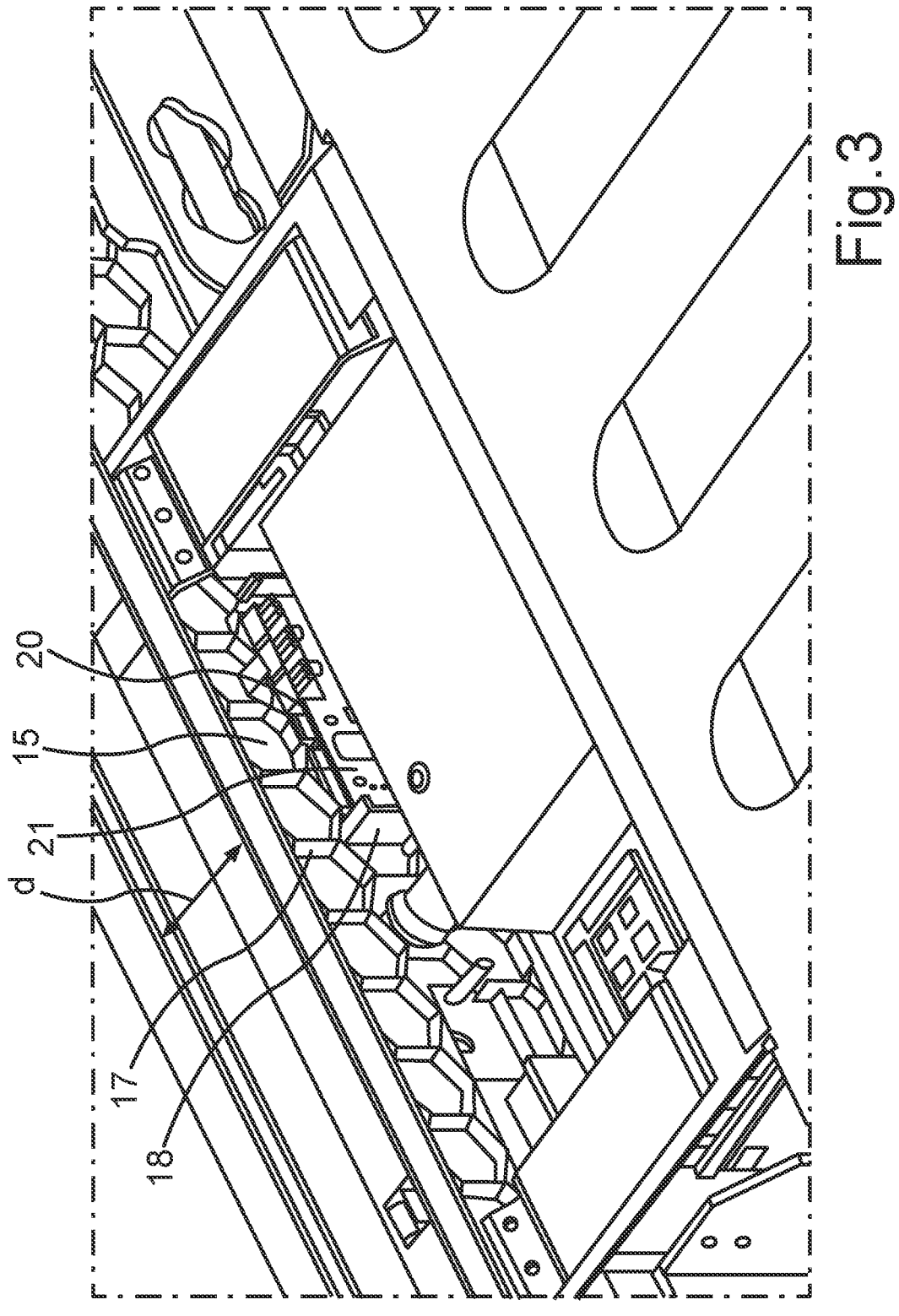
FIG. 3 is an enlarged, partial, perspective view of a section in FIG. 2.

The sensor housing 14 is illustrated in FIG. 3 in the enlarged representation. In this case, a sensor housing 14 is realized that is constructed from multiple sensor housing parts. A front sensor housing part 18 is illustrated herein in FIG. 3. This lies in particular directly on the rear side 15.

Figure 4:
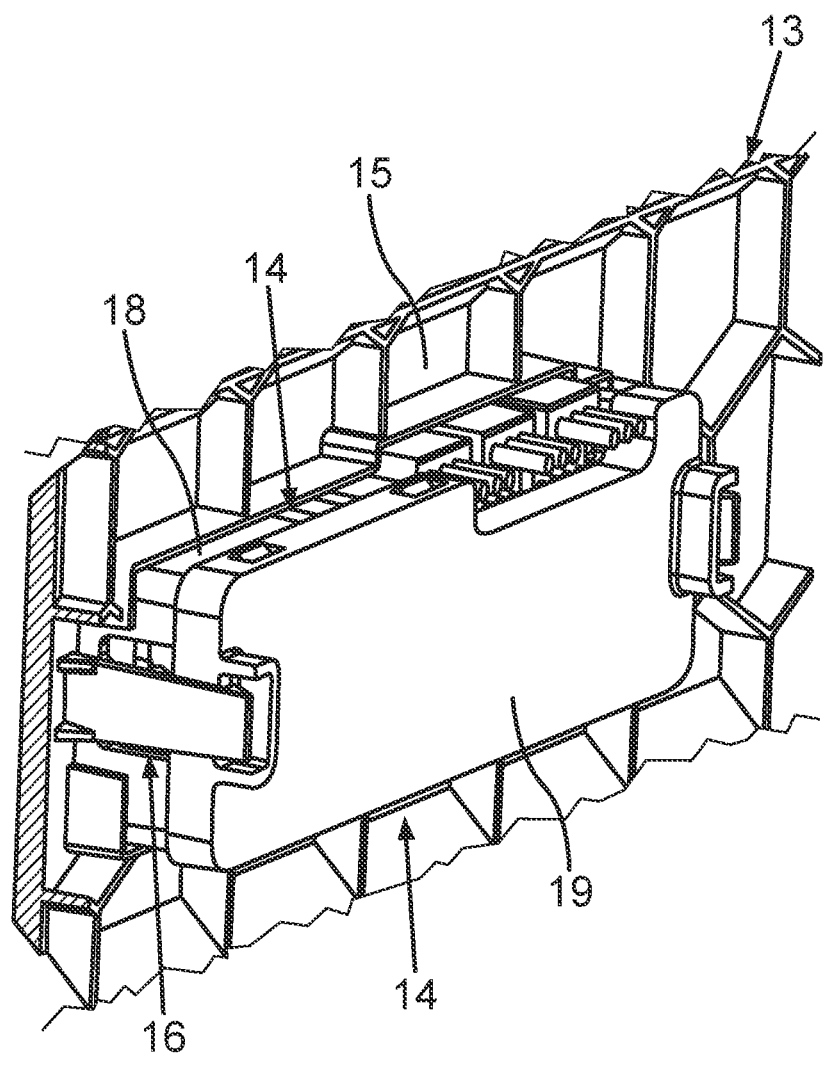
FIG. 4 is a perspective sectional view of a front strip having a sensor housing of an ambient light detection unit, which is disposed on the rear side of the front strip.

The sensor housing 14 in one exemplary embodiment furthermore has a further second sensor housing part 19. This is illustrated in FIG. 4. The two sensor housing parts 18 and 19 are connected to one another in one exemplary embodiment by a detachable connection, for example by a snap connection. It is also possible that the snap connection 16 with which the sensor housing 14 is disposed on the rear side is simultaneously also the snap connection with which the two sensor housing parts 18 and 19 are held together.

An interior space 20 (FIG. 3) is realized by the sensor housing parts 18 and 19. A circuit board 21 of the ambient light detection unit 8 is disposed in this interior space. In one exemplary embodiment, a brightness sensor 22 (FIG. 5) is disposed on this circuit board 21. In one exemplary embodiment, a moisture sensor 23 can additionally also be disposed on the common circuit board 21.

Figure 5:
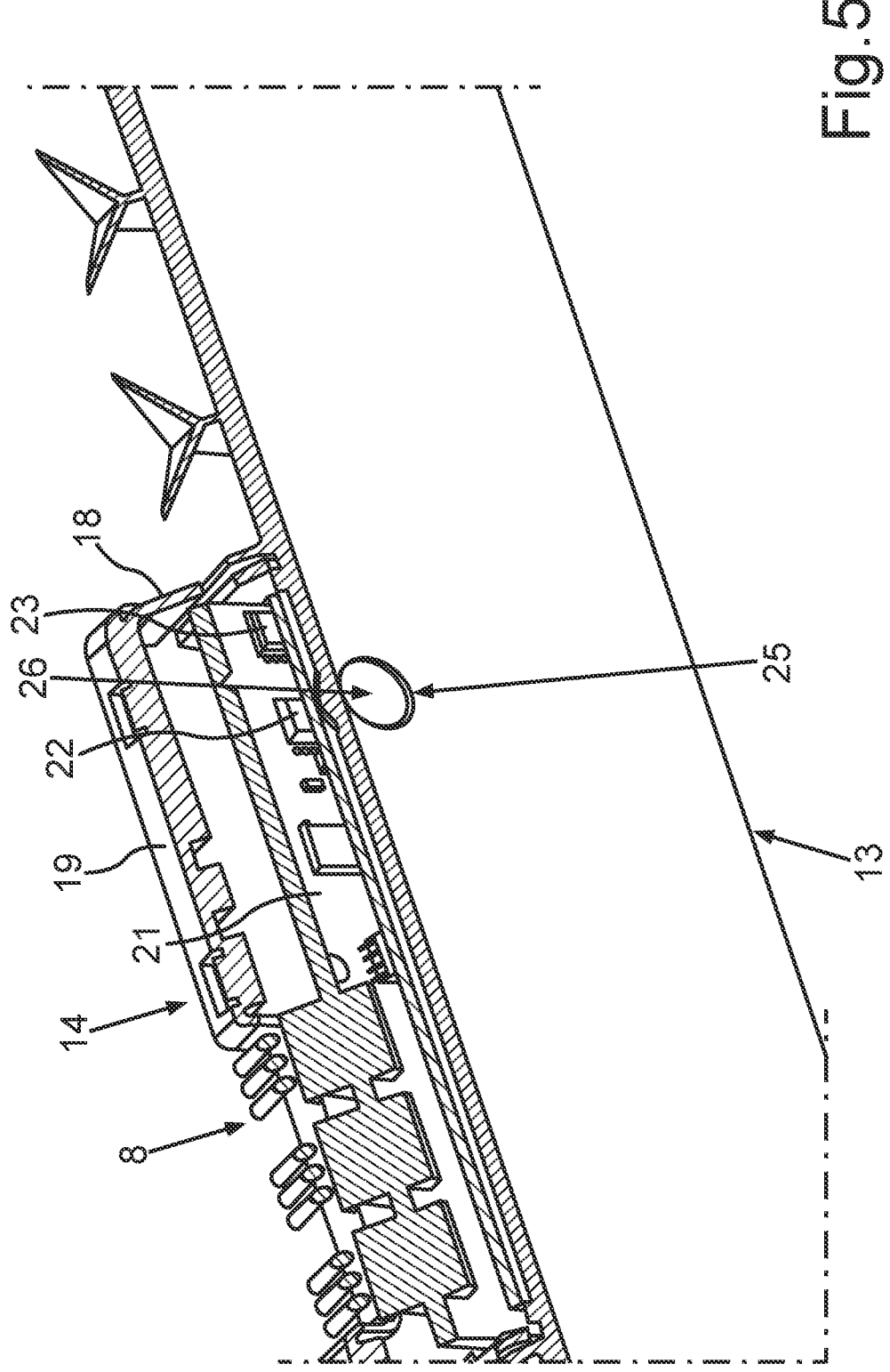
FIG. 5 is a perspective sectional view through the configuration in accordance with FIG. 4.

As in FIG. 5, in which a perspective sectional view of the configuration 24 in FIG. 4 is apparent, the front strip 13 has a throughgoing hole 25. Ambient light from the environment 9 can be incident through this hole in particular also through the front strip 13 into the sensor housing 14. It is in particular provided that the ambient light detection unit 8 has at least one optical imaging element, in particular a lens 26. The lens 26 is a lens that focuses incident ambient light. The lens can be configured to be curved in a convex manner on at least one optical upper side. In particular, the lens 26 is a converging lens. In one exemplary embodiment, the lens 26 is disposed on the sensor housing 14 with at least one outer side 26*a* (FIG. 8) exposed toward the environment 9.

In one exemplary embodiment, it is provided that the lens 26 is disposed so that incident ambient light is focused onto the brightness sensor 22. The lens 26 can be a separate component to the sensor housing 14, in particular to the front sensor housing part 18. It is also possible that the lens 26 is configured as a single piece with the front sensor housing part 18.

Figures 6, 7, 8:
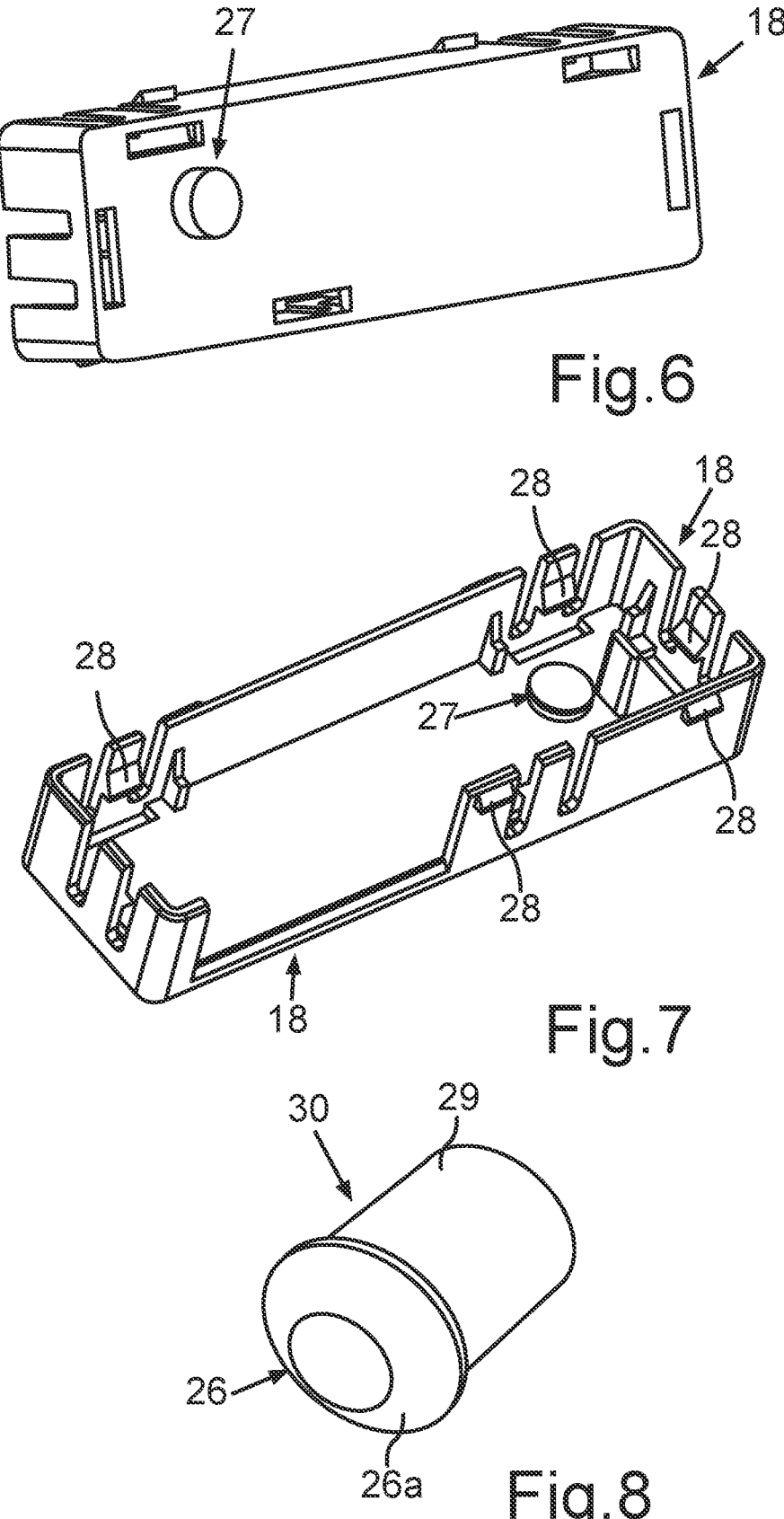
FIG. 6 is a perspective view of an exemplary embodiment of a part element of a sensor housing of an ambient light detection unit.
FIG. 7 is a perspective view of the sensor housing in accordance with FIG. 6, which is a different perspective view than FIG. 6.
FIG. 8 is a perspective view of an exemplary embodiment of an optical component of an ambient light detection unit.

In one exemplary embodiment, FIG. 6 illustrates a perspective representation of the front sensor housing part 18. It is apparent in this case that an optical element 27 is configured in an integrated manner with this sensor housing part 18. A single-piece embodiment of this type can be realized for example using plastic. For example, this entire component can be formed as an injection molded component. The optical element 27 can be for example the lens 26. It is also possible that this optical part 27 is a cylindrical light guide. A light guide of this type can be an additional component of the ambient light detection unit 8 in a further exemplary embodiment. In particular then if the ambient light detection unit 8 has both a lens 26 as well as a light guide, the lens 26 can be disposed in the beam path of the incident ambient light upstream of the light guide. Using a lens 26 and with a light guide, it is possible on the one hand to focus the light beams by using the lens 26 and on the other hand it is possible with the light guide to relay the light beams to the brightness sensor 22 in a more targeted and directed manner.

The front sensor housing part 18 is illustrated in FIG. 7 in a perspective that is different to FIG. 6. In particular, the snap elements 28 that are provided in an example are illustrated in FIG. 7 and only some of the snap elements are provided with a reference character. It is possible by using these snap elements 28 to directly snap to the rear sensor housing part 19 and/or the front strip 13.

A light guide 29 is illustrated in FIG. 8 in one exemplary embodiment. In addition, the lens 26 is illustrated therein. In one exemplary embodiment, the lens 26 that is curved at least on the front side in a convex manner can also be configured as a single piece with the light guide 29, in particular can be produced as a single piece. The lens 26 in one exemplary embodiment is then the front-side end of this entire component 30. The lens 26 can be disposed at least in regions in the hole 25. It is also possible that the lens 26 is disposed offset to the rear with respect to the hole 25.

The example of the single-piece entire component 30 that is illustrated in FIG. 8 can thereby be formed separately to the front sensor housing part 18 or as a single piece.

In one exemplary embodiment, the household appliance 1 has an illuminating apparatus 31 as is illustrated symbolically in FIG. 1. This illuminating apparatus 31 is disposed so as to illuminate the at least one receiving compartment 3. In particular, when the door 4 is in the opened state, this illuminating apparatus 31 is activated.

A control unit 32 of the household appliance 1 is provided. It is possible using the control unit 32 to control the functional components of the household appliance 1. In particular, it is also possible using the control unit 32 to control the illuminating apparatus 31. In particular, this is performed in dependence upon the ambient brightness that is detected using the ambient light detection unit 8. The illumination of the receiving compartment 3 can thereby be provided in a particularly needs-based manner using this illuminating apparatus 31 and can be adapted to the ambient brightness in the environment 9.

In particular, it is provided that the ambient light detection unit 8 is activated in dependence upon an actuation of the door 4. It is possible to provide a door actuation identification unit 33 for this purpose. In one exemplary embodiment, this door actuation can also consequently be detected automatically. A door actuation is for example the initiation of an opening procedure starting from when the door 4 is in the closed state. If for example the door 4 is opened starting from the closed state, the detection of the ambient light and the evaluation of the brightness of the ambient light are started by the control unit 32. It is possible in one exemplary embodiment for this purpose to provide that a defined time delay is predetermined between the beginning of the door actuation and the start of the detection of the brightness of the ambient light. This can be for example at most one second. This means that after the beginning of the door actuation and after this predetermined time delay has elapsed then the detection of the ambient light using the ambient light detection unit 8 is started. In one exemplary embodiment, the period of time for this detection procedure is predetermined. In one exemplary embodiment, this detection period of time can last between 0.5 seconds and 1.5 seconds. After the evaluation of the information with regard to the ambient light, the illuminating apparatus 31 is then controlled individually by the control unit 32 in order to generate a specific illumination scenario in the receiving compartment 3. A user who is looking into the receiving compartment 3 when the door 4 is in the opened state is thereby not dazzled or confronted with an illumination that is excessively weak or an illumination that is too bright. In particular, when the door 4 is opened the user also perceives this required adaptation of the illumination scenario of the receiving compartment 3 with the illuminating apparatus 31. It is preferred therefore that this adaptation of the illumination of the receiving compartment 3 in the case of a door 4 that is already in a part opened state is performed so that the user also very deliberately perceives this change of this illumination scenario. It is also possible in this context that with the beginning of the door actuation the illuminating apparatus 31 is illuminated with a predetermined base brightness and/or a predetermined base light color. If the detection of the ambient light and the determination of the brightness of the ambient light is concluded, in one exemplary embodiment, this base setting of the illuminating apparatus 31 is promptly adapted as required. For example, the brightness can then be successively increased in this case starting from a base value, for example 25 percent of the maximum brightness of the illuminating apparatus 31, in particular within a predetermined time interval. This time interval can be for example between 0.5 and 1.5 seconds. For example, the brightness can then be set to a value between 50 percent and 100 percent of the maximum brightness of the illuminating apparatus 31 in dependence upon the detected brightness of the ambient light. In this regard, it is also then possible to set discrete predetermined percentage brightness settings in dependence upon the maximum brightness of this illuminating apparatus 31.

Figures 9, 10:
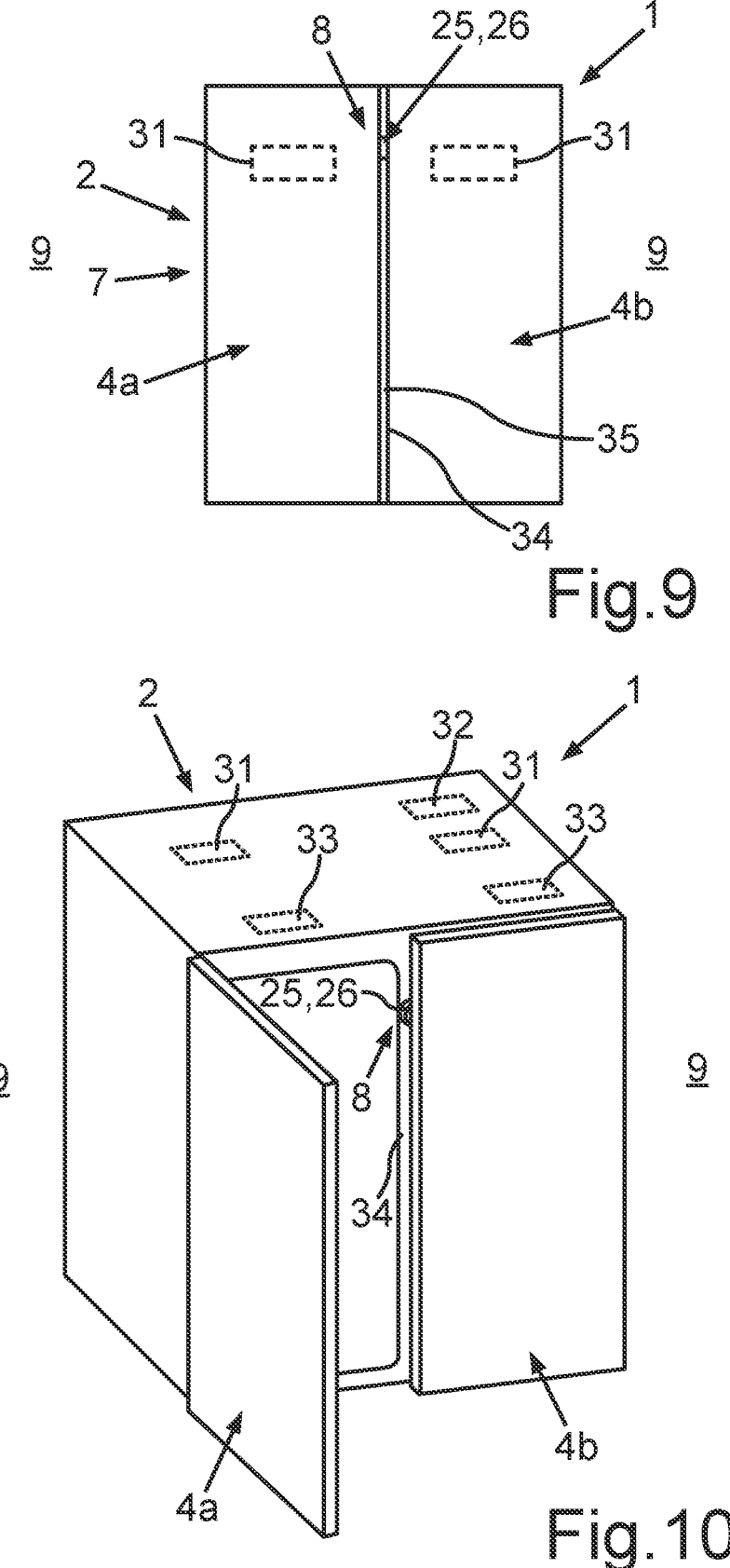
FIG. 9 is a front-elevational view of a further exemplary embodiment of a household appliance.
FIG. 10 is a perspective view of the exemplary embodiment in accordance with FIG. 9, having an opened door.

A further exemplary embodiment for a household appliance 1 is illustrated in FIG. 9. It is a household refrigeration appliance in this case. The household appliance is illustrated in the front view. The household appliance 1 has two separate doors 4a and 4b in this case. These are front doors. They can also be referred to as wing doors. They are disposed adjacent to one another in the width direction (x direction) in the illustrated closed state. They are disposed at the same height position and at the same depth position. The doors 4a and 4b in one exemplary embodiment each close a receiving compartment or interior space for food. The receiving compartments are separated from one another. In particular, the household appliance 1 has two separate illuminating apparatuses 31. Each one is provided for the illumination of one of the two receiving compartments. The illumination of the receiving compartments can be provided independently of one another using the allocated illuminating apparatuses 31. In particular, an illuminating apparatus is activated according to the explanations as have been stated above for the other exemplary embodiments.

When the doors 4a and 4b are in the closed state, a gap 35 can be formed between the mutually facing narrow sides of the doors 4a and 4b. A vertical front strip 34 is also apparent. The doors 4a and 4b lie on this front strip when in the closed state. The ambient light detection unit 8 is disposed on this front strip 34 that is oriented vertically in this case. In particular, the ambient light detection unit 8 is disposed on the rear side of the front strip 34. The construction of the ambient light detection unit 8 in one exemplary embodiment can be as has been explained in the previous exemplary embodiments. The vertical front strip 34 has a hole 25 through which ambient light can be incident to the brightness sensor 22. As is apparent in FIG. 1, the hole 25 is preferably disposed centrally between the doors 4a and 4b in particular centrally between the mutually facing narrow sides of the doors 4a and 4b. Since the gap 35 is small, in the state in which the two doors 4a and 4b are closed, the ambient light that is incident through the hole 25 is insufficient. When the doors 4a and 4b are in the closed state, the ambient brightness is therefore not detected. In particular, when the two doors 4a and 4b are in the closed state the ambient brightness detection unit 8 is therefore at least deactivated to the effect that the ambient brightness would be measured using the brightness sensor 22.

When the doors 4a and 4b are in the closed state, the hole 25 is covered respectively in regions by these doors.

If a door 4a, 4b is in the opened state, for example the door 4a, as is illustrated in FIG. 2, then the part region of the hole 25 that was covered by this door 4a is exposed. Also then if the other door, in this case the door 4b, remains closed, the hole 25 is then exposed to a sufficiently large extent with the result that sufficient ambient light can be incident and it is possible to perform a precise detection of the ambient brightness using the brightness sensor 22. In dependence upon this, the illuminating apparatus 31 is then activated and operated which is only intended to illuminate the receiving compartment that can be closed on the front side by the door that is in the opened state, in this case the door 4a.

Figure 11:
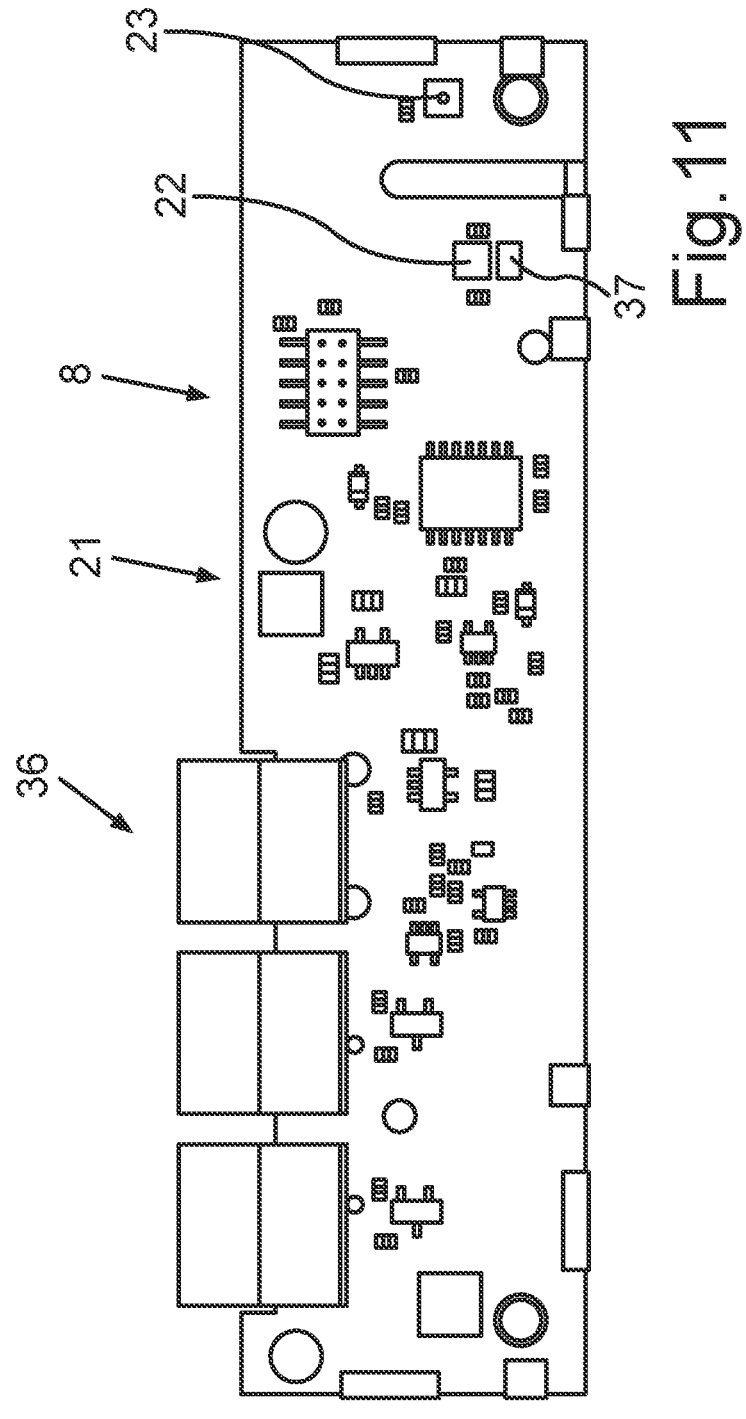
FIG. 11 is a plan view of a circuit board that is populated with multiple sensors, wherein the circuit board is a component of an ambient light detection unit.

FIG. 11 illustrates a plan view of an exemplary embodiment for a circuit board 21. This single coherent circuit board 21 is consequently configured as a single piece. This circuit board 21 is formed as a multi sensor circuit board. This means that at least two different sensors are disposed on this circuit board 21. One sensor can detect a first ambient parameter and the second sensor can detect a second ambient parameter that is different to the first ambient parameter. A sensor can be a brightness sensor 22. A sensor can be a moisture sensor 23. A further sensor can be a temperature sensor.

In one exemplary embodiment, the ambient light detection unit 8 has a communication interface 36 that is illustrated herein in an exemplary manner. The communication interface 36 is in particular a D bus interface. The communication interface 36 can be an I2C bus. It is consequently possible to transmit information from multiple different sensors through only one such specific communication interface 36. This information that is detected by the sensors can consequently be transmitted using this communication interface 36 to a control unit, in particular the control unit 32. For example, it is thereby possible to control an illuminating apparatus 31 and/or a heating system of the household appliance 1.

In one exemplary embodiment, the circuit board 21 has receiving regions 37 (FIG. 11) that are configured so as to receive different sensor types, wherein the different sensor types however detect the same ambient parameters. A variability for the installation of different sensor types is consequently provided and it is also possible for this purpose to use the same circuit board 21. This means that the layout of the circuit board 21 is identical regardless of which sensor type is installed thereon. In particular, for this purpose the receiving compartments are formed as specific solder pads. This exemplary embodiment can also be provided in addition to the exemplary embodiment having the multi sensor configuration having different sensors that detect different physical ambient parameters.

Figure 12:
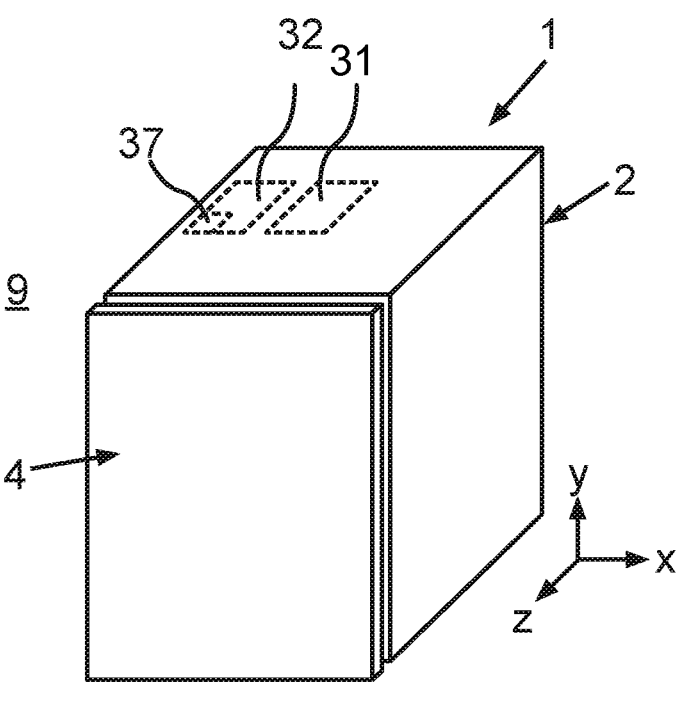
FIG. 12 is a perspective view of the household appliance in accordance with the invention, having an entirely closed door.

FIG. 12 illustrates in a perspective representation an exemplary embodiment of the household appliance in accordance with the invention. The household refrigeration appliance 1 has a housing 2. At least one receiving compartment 3 or interior space for food is formed in the housing 2. A receiving compartment 3 of this type can be for example a refrigerator compartment or a freezer compartment. Furthermore, the household appliance 1 has a door 4. The door 4 has a door closure strip 4c on the upper edge or flank and the ambient light detection unit 8 can likewise be disposed on the rear side on the door closure strip. This is illustrated in FIG. 1 in the entirely closed state. The door 4 closes the mentioned receiving compartment on the front side. The household appliance 1 furthermore has a control unit 32. This control unit 32 is only illustrated symbolically in FIG. 1. The household appliance 1 furthermore has an illuminating apparatus 31. This is provided so as to illuminate a receiving compartment 3 (FIG. 3). The receiving compartment 3 in this regard is the receiving compartment for food, as has already been explained above.

The household appliance 1 is positioned in an environment 9.

In one exemplary embodiment, the receiving compartment or interior space is not illuminated when the door 4 is in the entirely closed state, as is illustrated in FIG. 12. In particular, this illuminating apparatus 31 is therefore deactivated in relation to the light emission when the door 4 is in this entirely closed state.

Figure 13:
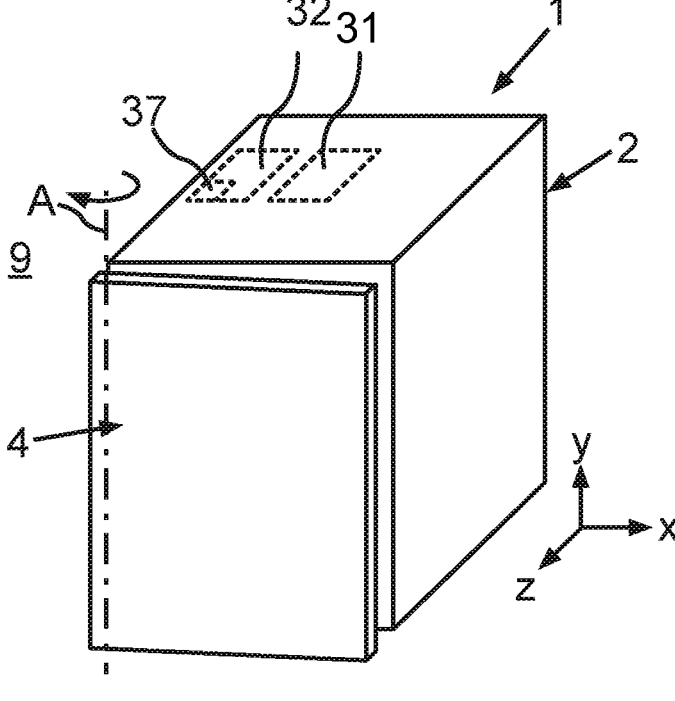
FIG. 13 is a perspective view of an exemplary embodiment of the household appliance in accordance with the invention.

If now starting from the situation that is illustrated in FIG. 1, the door 4 is transferred from the entirely closed state into an opened state, as is indicated symbolically in FIG. 13, in one exemplary embodiment, the illuminating apparatus 31 is activated. In particular, this procedure of opening the door 4 is therefore a starting criterion for activating the illuminating apparatus 31. In one exemplary embodiment, it is possible to provide that this opening of the door 4 is detected by a sensor and the information in relation to this is transmitted to the control unit 32. In dependence upon this, the illuminating apparatus 31 is then controlled by the control unit accordingly.

Figure 14:
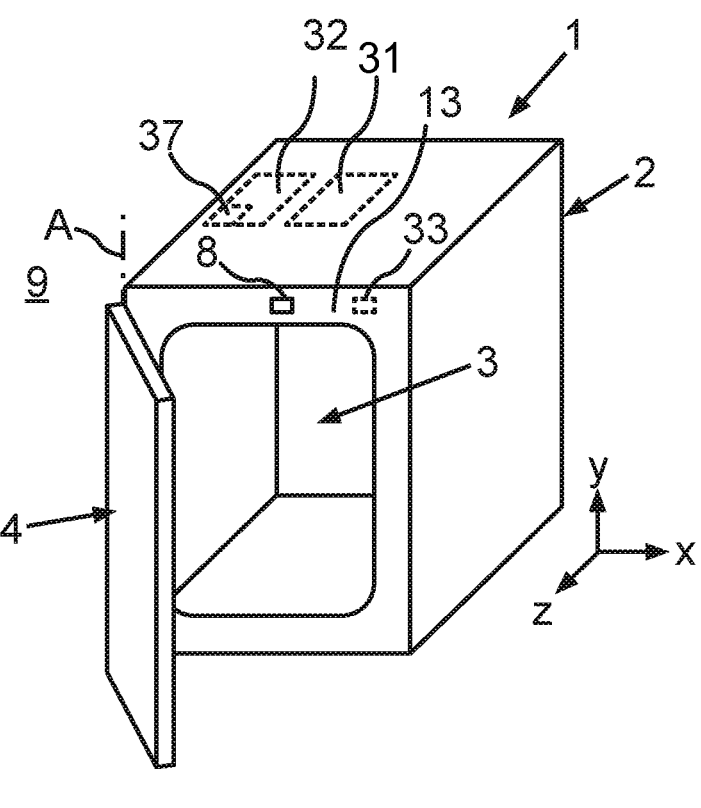
FIG. 14 is a perspective view of an exemplary embodiment of the household appliance in accordance with the invention, having a door that is opened further than in FIG. 13.

As is apparent in FIG. 14, the household refrigeration appliance 1 has at least one ambient light detection unit 8. This ambient light detection unit 8 is configured so as to detect the brightness in the environment 9. In one exemplary embodiment, the ambient light detection unit 8 can be disposed on a front strip 13 or front flange of the housing 2. Moreover, the ambient light detection unit 8 can also be disposed on the rear side on the door closure strip 4c of the door 4. In one exemplary embodiment, the front strip 13 is positioned so that it is at least shaded at least by the door 4 when the door 4 is in the closed state. This means that when the door 4 is in the closed state, the ambient light detection unit cannot or cannot sufficiently precisely detect the brightness of the environment 9. The door 4 can be a décor plate 12 that protrudes beyond the side edges of the door 4 (FIG. 2).

However, if the door 3 is opened or starts this opening procedure from the entirely closed state in accordance with the representation in FIG. 12, in one exemplary embodiment the ambient light detection unit 8 is no longer shaded by the door 4 and can then detect the brightness of the environment 9. This is illustrated in FIG. 13. In particular, it can be provided that in dependence upon where the ambient light detection unit 8 is disposed on the front strip 13, the opening angle of the door 4 is different with regard to a coverage, which is no longer provided, of the ambient light detection unit 8. In this case, it is possible to provide that the ambient light detection unit 8 is disposed relatively to the side on the front strip 13. This is in particular on the side that is the opening side in relation to the door 4 and that is initially moved away from the front strip 13 when the door is opened.

In relation to this then the opening angle after which the ambient light detection unit 8 can automatically detect the brightness of the environment 9 is smaller. Moreover, a door actuation identification unit 33, for example a magnetic, inductive or capacitive sensor or the like, is provided on the front strip 13 that is preferably provided closer to the opening side than the ambient light detection unit 8 with the result that the door actuation identification unit 33 promptly detects the lifting of the door 4 from the housing 2 and the opening angle of the door 4 is smaller after which the ambient light detection unit 8 can automatically detect the brightness of the environment 9 is smaller.

In one exemplary embodiment, the detection of the brightness of the environment using the ambient light detection unit 8 is performed in a time-delayed manner with respect to the start of the opening of the door 3. For example, the detection starts at a point in time that lies between 0.5 seconds and 1.5 seconds, in particular between 0.8 seconds and 1.2 seconds after the start of opening the door 4.

It is furthermore provided that the illuminating apparatus 31 is activated automatically with the start of the opening of the door 4, as has already been stated above. In one exemplary embodiment, it is provided for this purpose that with the start of the illuminating apparatus 31 an automatic setting of a base illumination scenario of the receiving compartment 3 is started. This then relates in particular to an illumination of the receiving compartment 3 with a base brightness and/or a base light color. If then starting from the situation that is illustrated in FIG. 13 the door 4 is further opened and consequently pivoted about its pivot axis A, then the state in accordance with FIG. 14 is achieved as a further example. In this state of the door 4, a pivot position is achieved in which a user can extensively look into the receiving compartment 3 and can extensively see into this receiving compartment.

It is provided that the brightness of the environment 9 is detected using the ambient light detection unit 8 of the household refrigeration appliance 1, wherein the detection is started automatically by virtue of opening the door 4. The evaluation of the detected brightness of the environment 9 is then performed, in particular using an evaluating unit 37. This evaluating unit 37 of the household refrigeration appliance 1 can be a component of the control unit 32. An end illumination scenario for the receiving compartment 3 is generated in dependence upon this brightness of the environment. The receiving compartment 3 is then illuminated using the end illumination scenario.

In one exemplary embodiment, the detection of the brightness of the environment 9 is only started automatically with or chronologically after the opening of the door 4 starting from when the door 4 is in the closed state. The detection of the brightness of the environment 9 is performed for a period of time of at most 2 seconds, in particular at most 1 second. In particular this detection is performed for a period of time between 0.5 seconds and 1.5 seconds, in particular for 1 second. Starting from the state in FIG. 13 in which the detection is just starting or can start, until the opening state of the door 3, as is illustrated for example in FIG. 14, in one exemplary embodiment in particular usually a period of time elapses that is greater than or identical to this period of time of the detection procedure. In particular, this period of time is usually greater than the period of time that is the basis for the detection of the brightness of the environment and additionally the period of time that elapses until the determination and setting of the end illumination scenario. In an advantageous manner, it is thereby achieved that especially in a state as is illustrated in FIG. 14 and in which in an exemplary manner a door position is represented in which a user can look extensively into the receiving compartment 3 at the front side and can extensively view this receiving compartment and in an ergonomic and easy and complete manner, the end illumination scenario is already begun to be set or is already set. The detection of the ambient brightness and the setting of the end illumination scenario therefore in one exemplary embodiment occupy an entire period of time that is smaller than or identical to the period of time until the door 4 has achieved an exemplary position as is illustrated in FIG. 14, starting from the closed position in accordance with FIG. 12.

Figure 15:
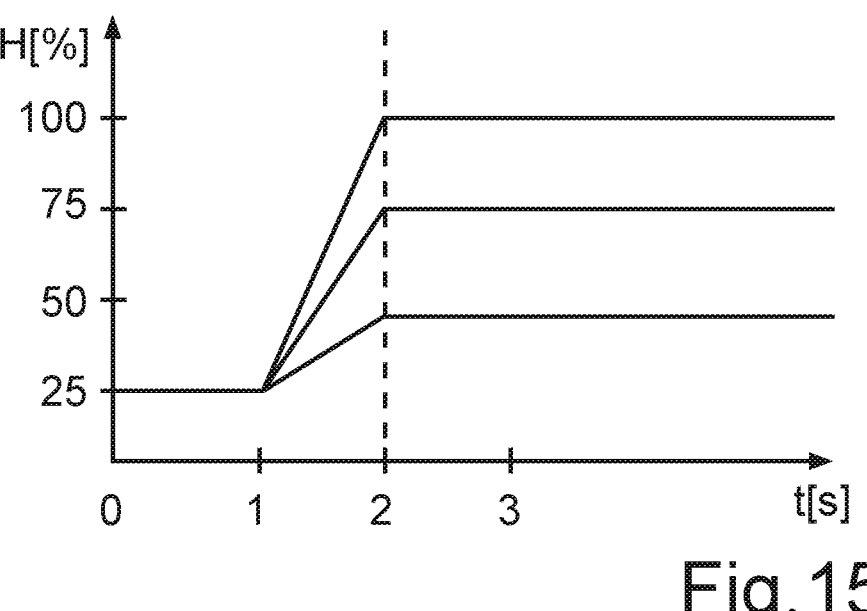
FIG. 15 is a diagram including examples for levels of brightness of the illuminating apparatus of the household appliance in dependence upon time.

The brightness H of the light of the illuminating apparatus 31 in dependence upon the time is illustrated in FIG. 15 in an exemplary diagram. As is apparent, a short time after the opening procedure the illuminating apparatus 31 is started and illuminates the receiving compartment 3 using a base brightness as is predetermined in the base illumination scenario. In the exemplary embodiment, this is for example 25 percent of the maximum brightness of the illuminating apparatus 31. During a period of time of for example 1 second, the brightness of the environment 9 is detected, wherein in this detection period of time the brightness of the illuminating apparatus 31 remains unchanged. In particular, the detection procedure starts approximately 1 second after the start of the opening of the door. If then the detection procedure and the generation of the end illuminating apparatus is concluded in dependence upon this detected brightness, for example within the mentioned period of time, it is preferred within 2 seconds, in particular within at most 1.5 seconds, in particular within 1 second, then the end illumination scenario is set. In this case, as is apparent in the diagram in FIG. 15, the base brightness is increased with the fixedly predetermined percentage brightness value in this case for example and is increased to the end brightness value that is associated with the end illumination scenario. It is possible to set in this case for example an increase of 50 percent or of 75 percent or of 100 percent of the maximum brightness of the illuminating apparatus 31. This change, in particular a dimming, in one exemplary embodiment lasts for a period of time less than 2 seconds, in particular less than 1.5 seconds, in particular between 0.5 seconds and 1.5 seconds. Therefore after the expiration of this specific time window, in this case in an exemplary manner after approximately two seconds after the beginning of the opening of the door 4, the end brightness of the end illumination scenario is set. In addition or in lieu of this, it is also possible to accordingly set the light color. The light color can consequently also be changed between the base illumination scenario and the end illumination scenario. In particular therefore, a particularly rapid method can be provided in which the detection of the ambient brightness can be performed particularly rapidly starting from a trigger criteria, namely the opening of the door until setting the end illumination scenario, in particular within a time interval less than or identical to three seconds, in particular less than or identical to 2.5 seconds.

This scenario is in particular then advantageous if the ambient light detection unit 8 is obscured in a shaded manner when the door is in the closed state and consequently is covered by the door 4 or another component part, in particular design plate 12 (FIG. 2). If the household appliance, in particular the household refrigeration appliance 1 is not a free-standing appliance but rather is for example an integrated appliance, the ambient light detection unit 8 can thus also be shaded by a furniture front plate, which is disposed on the front side of the door 4, when the door 4 is in the closed state. By virtue of this covered construction of such an ambient light detection unit 8 or a brightness detection sensor, this sensor is better protected. On the other hand, it is also consequently possible to achieve that the brightness of the environment is not permanently detected. This also has advantages in relation to the operation of the brightness detection sensor and in relation to the durability of the brightness detection sensor.

The following is a summary list of reference characters and the corresponding structure used in the above description of the invention.

LIST OF REFERENCE CHARACTERS

1 Household appliance
2 Housing
3 Receiving compartment
4 Door
4*a* Door
4*b* Door
4*c* Door closure strip
5 Container
6 Outer housing
7 Free space
8 Ambient light detection unit
9 Environment
10 Door leaf
11 Outer wall
12 Design plate
13 Front strip
14 Sensor housing
15 Rear side
16 Snap connection
17 Reinforcing structure
18 Sensor housing part
19 Sensor housing part
20 Interior space
21 Circuit board
22 Brightness sensor
23 Moisture sensor
24 Configuration
25 Hole
26 Lens
26*a* Outer side
27 Optical element
28 Snap element
29 Light guide
30 Entire component
31 Illuminating apparatus
32 Control unit
33 Door actuation identification unit
34 Front strip
35 Gap
36 Communication interface
37 Evaluating unit
x Width direction
y Height direction
z Depth direction
A Longitudinal axis

The invention claimed is:
1. An integrated household appliance, comprising:
a housing having a front strip;
a door fastened to said housing, said door having a door leaf with a front side;
a separate design plate disposed on said front side of said door leaf;

an ambient light detection unit disposed on said front strip, said ambient light detection unit having a sensor housing;

said front strip having a hole formed therein through which said ambient light detection unit detects ambient light;

said hole overlapping said design plate in a height direction of the household appliance, and said hole and said design plate defining at most a minimum distance therebetween in a depth direction of the household appliance, resulting in said hole being at least shaded by said design plate; and a brightness sensor disposed in said sensor housing, said brightness sensor detecting a brightness of light in an environment of the household appliance.

2. The household appliance according to claim 1, wherein said ambient light detection unit is disposed on said front strip or said door closure strip with at least one snap connection.

3. The household appliance according to claim 1, wherein said hole is at least shaded when said door is in a closed state, resulting in ambient light being at least reduced upon arriving at said hole.

4. The household appliance according to claim 3, wherein said door is one of two separate doors disposed adjacent one another in a width direction of the household appliance, and said hole is formed in said front strip between said two doors.

5. The household appliance according to claim 4, wherein said hole is formed centrally between said two doors.

6. The household appliance according to claim 1, which further comprises a door actuation identification unit configured to detect an actuation of said door, said brightness sensor configured to be activated so as to detect the ambient brightness in dependence upon said door actuation.

7. The household appliance according to claim 1, wherein said ambient light detection unit has a lens focusing ambient light incident on said sensor housing toward said brightness sensor.

8. The household appliance according to claim 7, wherein said lens has at least one of at least one convex side or a focus in which said brightness sensor is disposed.

9. The household appliance according to claim 7, wherein said lens is formed as a single piece with said sensor housing.

10. The household appliance according to claim 9, wherein said sensor housing and said lens form an injection molded component.

11. The household appliance according to claim 9, wherein said lens is disposed on said sensor housing with at least one outer side exposed toward the environment.

12. The household appliance according to claim 1, wherein said ambient light detection unit has a light guide with which incident ambient light is guided.

13. The household appliance according to claim 12, wherein:

said lens and said light guide are coupled to one another, or said lens is disposed in a beam path of ambient light upstream of said light guide, or said lens is configured as a single piece with said light guide at an end of said light guide.

14. A method for operating an integrated household appliance, the method comprising:

providing a housing having a front strip;

opening a door of the household appliance, the door having a door leaf with a front side and a separate design plate disposed on the front side of the door leaf;

automatically setting a base illumination scenario for illuminating a receiving compartment of the household appliance being opened by the opening of the door, the base illumination scenario being independent of a brightness in the environment of the household appliance;

using an illuminating apparatus of the household appliance to illuminate the receiving compartment;

providing an ambient light detection unit disposed on the front strip, the ambient light detection unit having a sensor housing:

using a brightness sensor disposed in the sensor housing of the ambient light detection unit of the household appliance to detect the brightness of the environment of the household appliance, and starting the detection automatically by the opening of the door;

using the ambient light detection unit to detect the ambient light through a hole formed in the front strip, the hole overlapping the design plate in a height direction of the household appliance, and the hole and the design plate defining at most a minimum distance therebetween in a depth direction of the household appliance, resulting in the hole being at least shaded by the design plate;

using an evaluating unit of the household appliance to evaluate the detected brightness of the environment;

generating an end illumination scenario for the receiving compartment in dependence upon the detected brightness; and illuminating the receiving compartment by using the end illumination scenario when the door is in an opened state.

\* \* \* \* \*